Jan. 7, 1964     E. TRÜMPELMANN ETAL     3,116,873
CALCULATORS

Filed Sept. 29, 1958                                    17 Sheets-Sheet 1

INVENTORS.
ERNST TRÜMPELMANN
KARL WESTINGER
ERNST ALTENBURGER
OTTO HIRT
BY
Michael S. Striker

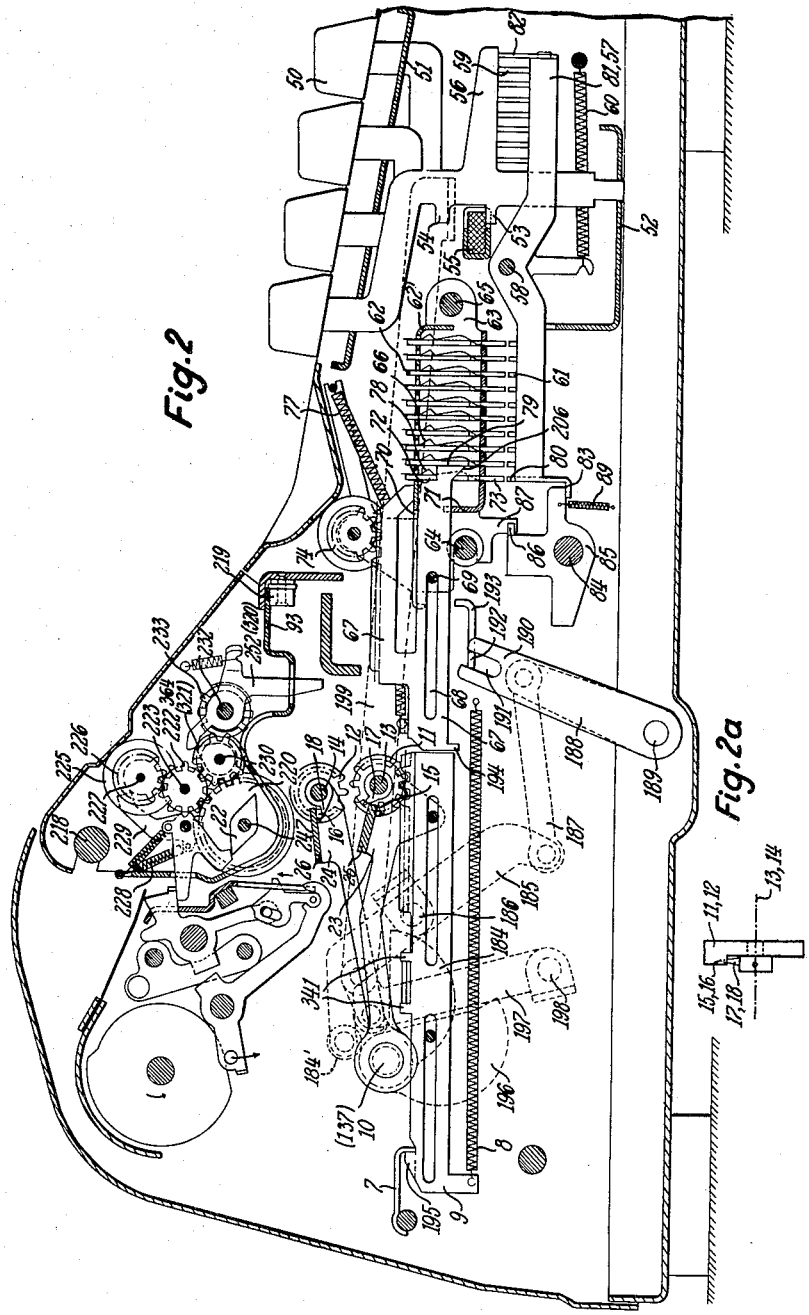

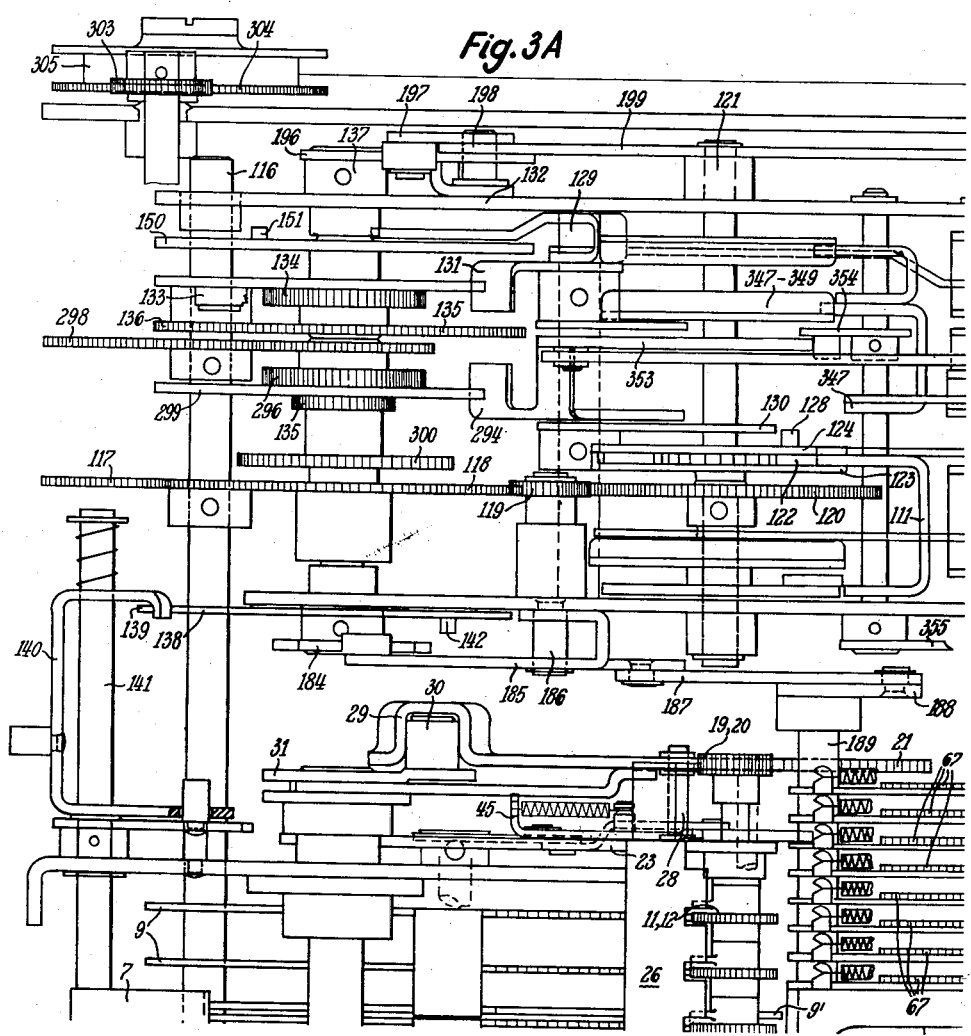

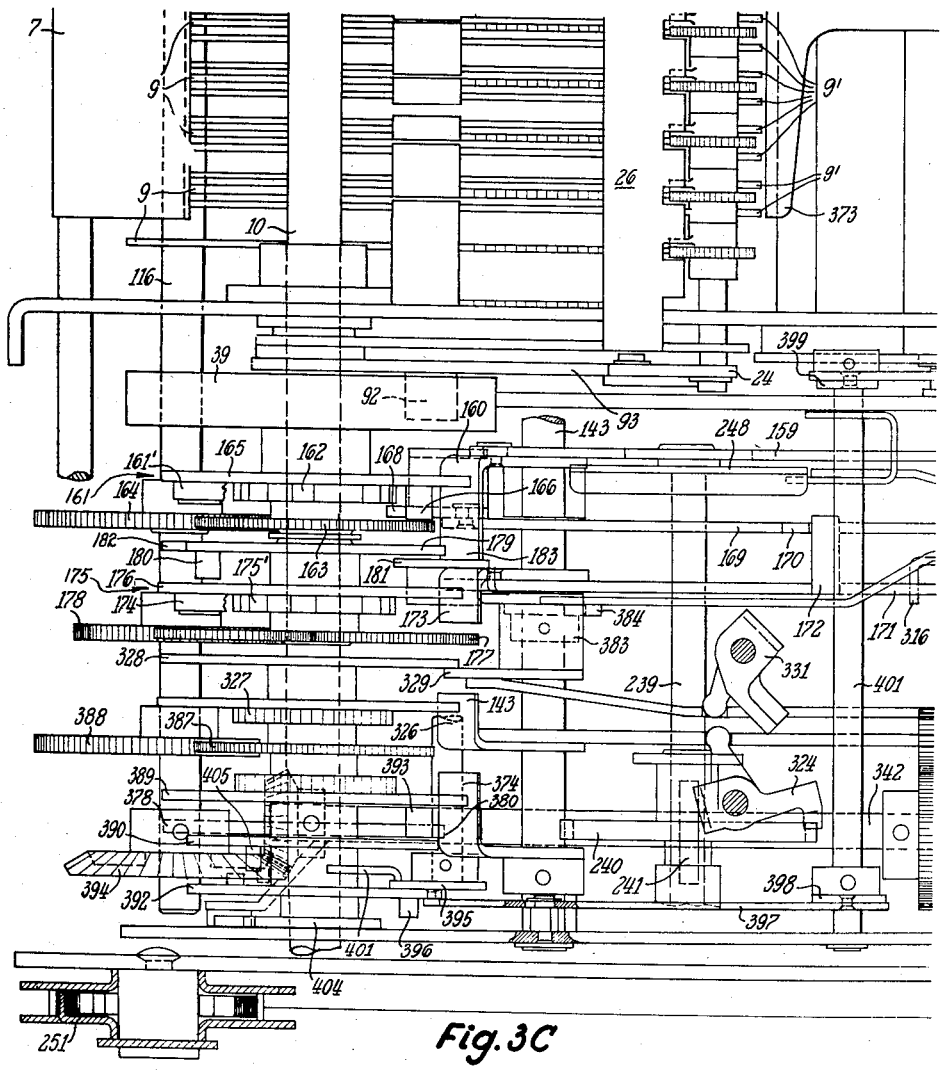

Jan. 7, 1964   E. TRÜMPELMANN ETAL   3,116,873
CALCULATORS

Filed Sept. 29, 1958   17 Sheets-Sheet 8

INVENTOR.
ERNST TRÜMPELMANN
KARL WESTINGER
ERNST ALTENBURGER
OTTO HIRT
BY
Michael S. Striker Jan. 7, 1964    E. TRÜMPELMANN ETAL    3,116,873
CALCULATORS
Filed Sept. 29, 1958    17 Sheets-Sheet 9

INVENTOR.
ERNST TRÜMPELMANN
KARL WESTINGER
ERNST ALTENBURGER
OTTO HIRT
BY
Michael S. Striker
A Frey Jan. 7, 1964　　E. TRÜMPELMANN ETAL　　3,116,873
CALCULATORS
Filed Sept. 29, 1958　　17 Sheets-Sheet 10

INVENTOR.
ERNST TRÜMPELMANN
KARL WESTINGER
ERNST ALTENBURGER
BY　　OTTO HIRT

Michael S. Striker

Jan. 7, 1964  E. TRÜMPELMANN ETAL  3,116,873
CALCULATORS
Filed Sept. 29, 1958  17 Sheets-Sheet 11

INVENTOR.
ERNST TRÜMPELMANN
KARL WESTINGER
ERNST ALTENBURGER
OTTO HIRT
BY Michael S. Striker Jan. 7, 1964  E. TRÜMPELMANN ETAL  3,116,873
CALCULATORS
Filed Sept. 29, 1958  17 Sheets-Sheet 12

INVENTOR.
ERNST TRÜMPELMANN
KARL WESTINGER
ERNST ALTENBURGER
BY  OTTO HIRT

Michael S. Striker

Jan. 7, 1964 E. TRÜMPELMANN ETAL 3,116,873
CALCULATORS
Filed Sept. 29, 1958 17 Sheets-Sheet 13
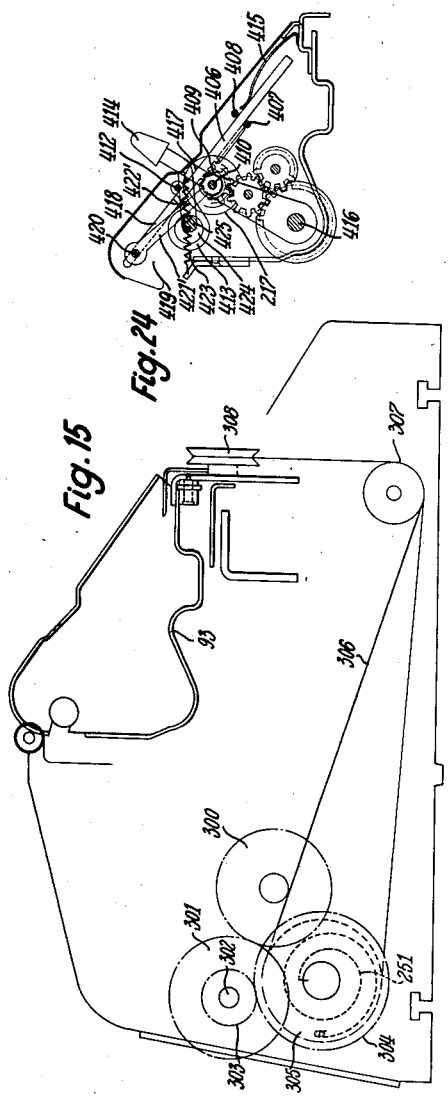
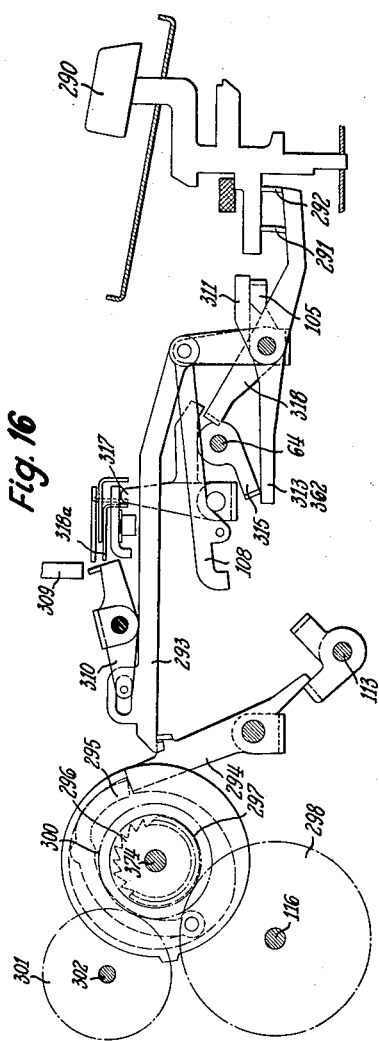
INVENTOR.
ERNST TRÜMPELMANN
KARL WESTINGER
ERNST ALTENBURGER
BY OTTO HIRT
Michael S. Striker Jan. 7, 1964   E. TRÜMPELMANN ETAL   3,116,873
CALCULATORS
Filed Sept. 29, 1958   17 Sheets-Sheet 14

INVENTOR.
ERNST TRÜMPELMANN
KARL WESTINGER
ERNST ALTENBURGER
BY   OTTO HIRT

Michael S. Striker
R. Horsey

Jan. 7, 1964   E. TRÜMPELMANN ETAL   3,116,873
CALCULATORS
Filed Sept. 29, 1958   17 Sheets-Sheet 15
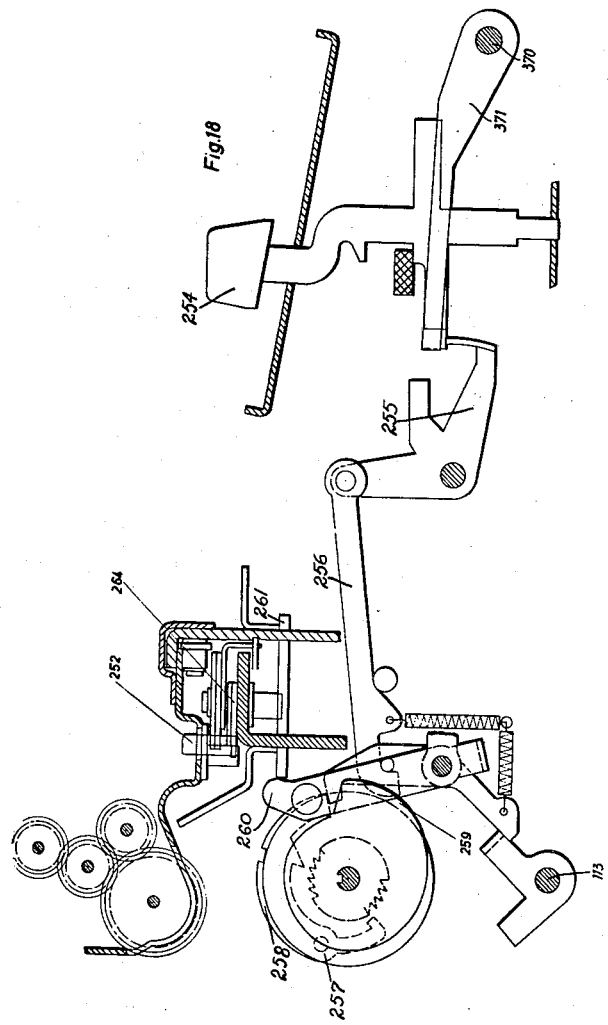
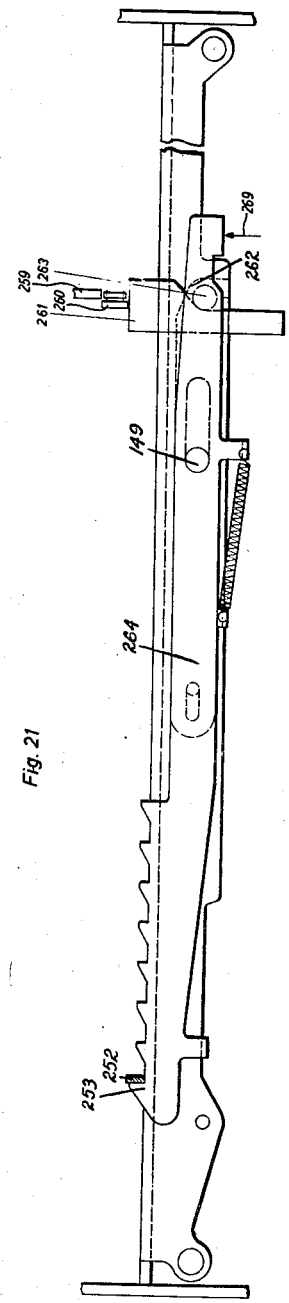
INVENTOR.
ERNST TRÜMPELMANN
KARL WESTINGER
ERNST ALTENBURGER
OTTO HIRT
BY
Michael S. Striker
Attorney United States Patent Office 3,116,873
Patented Jan. 7, 1964

3,116,873
CALCULATORS
Ernst Trümpelmann, Balingen, and Karl Westinger, Ernst Altenburger, and Otto Hirt, Oberndorf (Neckar), Germany, assignors to Olympia-Werke A.G., Wilhelmshaven, Germany
Filed Sept. 29, 1958, Ser. No. 765,916
Claims priority, application Germany Oct. 4, 1957
21 Claims. (Cl. 235—63)

The invention pertains to a calculator having a small keyboard area in the United States used as the ten-key board, a pin carriage and at least one counter mechanism.

The primary object of the invention is to divide the machine into three main function sections, and to operate the three main function sections in a selected sequence.

The first main function section is associated with the input means of the machine and comprises the means by which a value introduced into the machine is entered into a storage mechanism. A first main clutch is associated with this section and actuates the same, when engaged.

The second main function section is associated with the storage and transfer of values within the storage mechanism and from the storage mechanism to the accumulator and counter means of the machine. A second main clutch is associated with this section and actuates the same, when engaged.

The third main function section is associated with the clearing of the accumulator and of the storage mechanism. A third main clutch is associated with this section and actuates the same, when engaged.

In accordance with the present invention, the three main clutches are operatively connected so that the three main clutches effect actuation of the three main function sections in a predetermined sequence.

Another object of the invention is to employ in the apparatus to the greatest possible extent the principle of sectional building. The main function sections are self-contained units and can be individually tested before the assembly of the calculator.

Still another object of the invention is to permit control of the cycles in sequences. This is accomplished by using the principle of controlling each main function section by elements of the immediately precedingly operating main function section.

The several function-sections, however, are independent from each other and cannot be operated prior to a predetermined course of the operation of the previous main function section. One of these secondary function groups interposed between the main function sections is formed by members, which cause the return trip of the carriage. In accordance with the invention a carriage return clutch which motivates these members has automatic means to open as soon as the computer carriage reaches a previously preset position.

Another object of the invention is to arrange the members which release the next following main function section as much as possible on the loaded side of the shaft of the motivating clutch of the previous main function section. Thus the individual main function sections apply only a limited force to the smallest number of intermediate members.

Another object of the invention is the improvement of the calculating apparatus of the present invention by providing an auxiliary storage mechanism to speed up the calculations. The mechanism may be coupled with the counter mechanism, so that in case of a repetitive series of multiplications with the same multiplier, this constant factor may be repeatedly re-introduced into the counter mechanism with a single movement.

Another object of the invention is to increase the calculating speed of the apparatus by providing means to selectively add or subtract the result of a multiplication immediately to or from, a value appearing in the calculating mechanism.

It is another object of the invention to provide an embodiment of the calculator having a distance between the individual decade gears of a storage mechanism greater than the distance between the corresponding gears of the pin carriage. Connecting elements are therefore provided which enable the gear racks which set the storage mechanism to immediately transfer values set in the pin carriage. In accordance with the invention these connecting members are exceedingly simple, and comprise auxiliary rods running parallel to the gear racks, which engage the gears of the storage mechanism. These are firmly connected with the auxiliary rods by crossovers or similar transition pieces.

Additional objects of the invention will become apparent from the following description of an embodiment of the invention. The various features may be employed in different embodiments of the invention independently or jointly.

FIGURE 2 is a side assembly view in cross-section of the calculator.

FIGURE 2a is a plan view of a gear and gear projection of a gear set in the storage mechanism shown in FIGURE 2.

FIGURE 15 is a view of the mechanism for the computer carriage drive.

FIGURE 16 is a view of the carriage return clutch together with the actuating mechanism for the multiplication key.

FIGURE 18 is a view of the subtraction assembly.

FIGURE 21 is a view of the computer carriage ratchet with a part of the subtraction mechanism.

FIGURE 24 is a view of the auxiliary storage mechanism on the counter carriage for re-entry of a constant factor.

FIGURES 25a–i, and 25k–p inclusive are schematic diagrams of the several positions of the storage mechanism.

With these and other objects in view, as will hereinafter more fully appear, and which will be more particularly pointed out in the appended claims, reference is now made to the following description taken in connection with the accompanying drawings.

Figure 1:
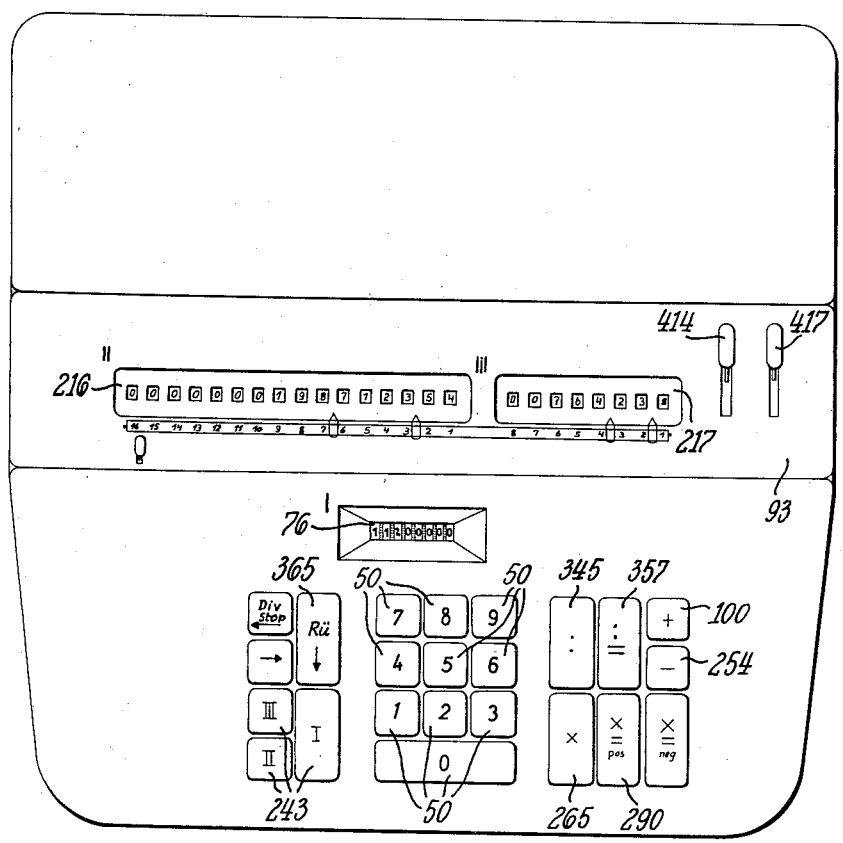
FIGURE 1 is a plan view of the calculator of the present invention with the cover in place.

The 10 key board is shown in the center of FIG. 1 as a conventional key-board. On the right hand side are positioned function keys, the multiplication "×" key, 265, which serves the multiplication; the "×=pos" key which serves to add the multiplication result to a number appearing on the indicator of the calculating mechanism 216; the multiplication negative key "×=neg" which serves to subtract the multiplication result from a number appearing on the indicator of the calculating mechanism; the conventional addition and subtraction keys 100 and 254 resp.; the first division key ":" which serves the purpose of setting the various operating mechanisms to the proper position to begin a division calculation; the second division key ":=" which serves to initiate the division calculation after the divisor and the dividend have been entered into the machine.

Above the ten-key board is a register window marked I which records the number which was keyed in on entry numeral disks 76. Above the register window is the computer carriage 93 having a left hand portion, marked II, which is the plan view of the calculating mechanism 216 and having a right hand portion, marked III, which is the counter mechanism 217. Underneath of the two sections are manually operable decimal markers. The levers 414 and 417, shown in the upper right hand corner are levers to control multiplication by constant factor.

On the left hand of the ten-key board are keys marked I, II, and III which serve to clear the numerical values appearing in the corresponding windows I, II and III respectively, mentioned above.

The left and right arrow keys move the computer carriage to the right or left any desired amount for the purpose of limiting the number of digital positions in which the calculation is performed to that required by the exactitude of the answer desired.

The key marked RU with a downward pointing arrow is the transfer key 365, which serves to transfer a value appearing in the computer carriage into the gear sets 11 and 12 for future use.

In FIGS. 2 and 3 are shown the principal parts of the calculator. The computer carriage 93 with its associated parts appears of the top of FIGURE 2.

Figure 3B:
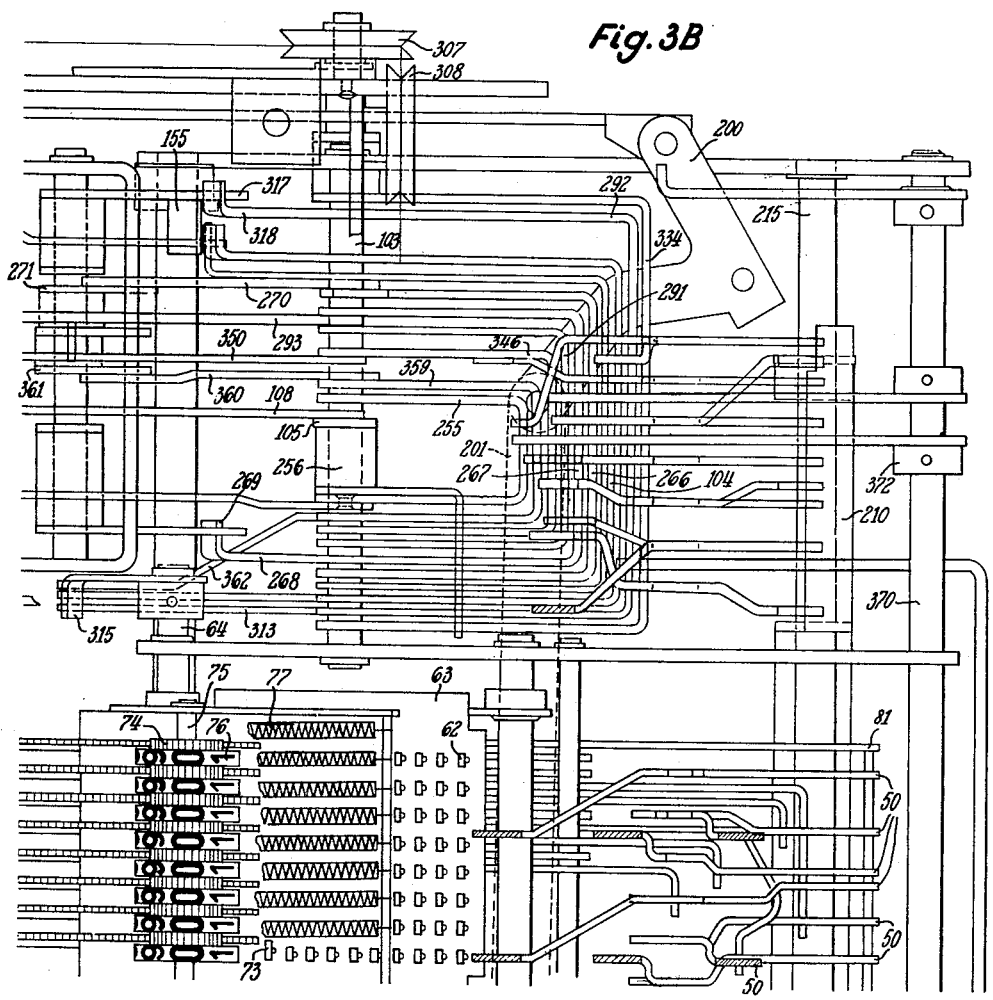
FIGURE 3 is a plan view of the entire assembly of the calculator and comprises four portions designated FIG. 3a, FIG. 3b, FIG. 3c and FIG. 3d.
Figure 3D:
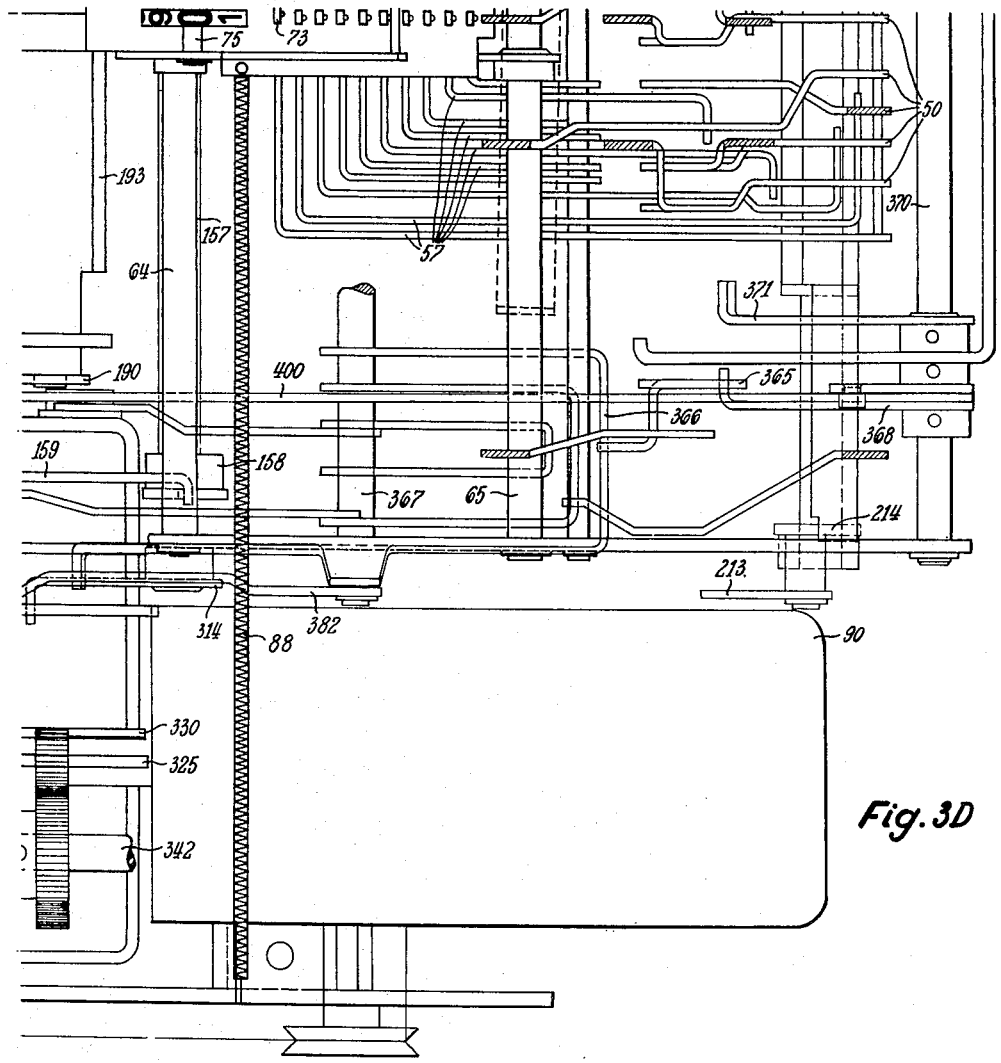

At the right hand side of FIGURE 2 and in FIGS. 3B and 3D is shown the key board region with its associated parts. To the left of the key board in FIGURES 2 and 3B and 3D is shown the pin carriage 63.

To the left of the pin carriage in FIG. 2 and in FIGS. 3A and 3C is shown the storage mechanism with its gear sets 11 and 12 and other associated parts.

In FIGURE 2 underneath the storage mechanism are the value entry rods 9 and between the value entry rods and the pin carriage are the setting pin gear racks 67.

In FIG. 3D appears the main drive motor 90.

The various clutch mechanisms are generally shown in FIGS. 3A and 3C.

The details of the above figures and the other figures of the drawings of this application are discussed in greater detail as follows.

I. ENTERING VALUES INTO THE SETTING MECHANISM AND INTO THE STORAGE MECHANISM

By depression of number keys 50, setting pins 62 are guided upward into the pin carriage. Spring loaded gear racks 67 are contacted by the pins. The motion is transmitted through the teeth of the gear racks to the number wheels of the pin carriage. The positions of the racks 67 is sensed by value entry rods 9, whose teeth in turn position the lower gears of the gear pairs 11, 12. The lower gears 11, in which the entry number is entered, are then lifted from the value entry rods 9 and brought into engagement with the upper gears 12 of the storage mechanism. The latter in turn are brought into engagement with one of the portions of the computer carriage. The value set up in the lower gears 11 of the storage mechanism is thereupon transferred through the upper gears 12 of the storage mechanism to the computer carriage by simultaneously restoring the lower gears to their starting position. The entry value is now set up not only in the computer carriage, but also in the upper gears 12 of the storage mechanism.

Next, the engagement of the computer carriage with the gears 11 and 12 is broken. The upper gears 12, which still hold the originally selected entry value, are returned to their starting position, thereby re-transferring that value again to the lower gears 11, with which they are still in engagement. Thus the upper gears 12 store an entry value simultaneously with the transfer of the value to the computer carriage. As soon as the connection with the computer carriage is broken, this value again is transferred immediately from the upper gears 12 to the lower gears 11. This is particularly important in the multiplication operation, which in this type of calculator is carried out by effecting a series of additions corresponding to the numerical value of the multiplier. The number is then immediately and continuously available in the storage mechanism for repetitive entry into the computer carriage, that is, for repetitive addition. When it is not necessary to keep the entry value available (for example, in the case of a simple addition of two numbers) the entry value will be cleared by a separate operation.

The number keys 50 run vertically in a key housing 51 and traverse 52. The keys have two buffer tangs 53 and 54, between which is a buffer 55 of sound-damping material. Each number key also carries an extension 56, mounted to engage one of the rocker arm projections 59. As shown in FIGS. 2 and 3 each projection 59 is mounted on a double setting pin rocker arm 57, the rocker arms 57 being pivoted about suitable bearings on a common shaft 58. Each extension 56 also operates on a projection 82 on a shift pin rocker arm 81 mounted parallel to rocker arm 57. Rocker arm 81 also pivots on a bearing on shaft 58. Each rocker arm 57 and 81 is kept in neutral position by a spring 60. On the ends of the rocker arms 57 which are away from extensions 56 are nibs 61. On depression of a number key the appropriate nib pushes against the bottom of one of the setting pins 62 of a pin-carriage 63. Each rocker arm 81 has a nib 80, which engages a shift pin 73. The shift pins 73 are arranged in front of setting pins 62 and in the same manner as the latter in the pin-carriage 63. The pin-carriage 63 is mounted on two cross-shafts 64 and 65. The pin carriage has several rows of setting-pins 62, the number of rows corresponding to the capacity of the setting mechanism for digits 0 to 8. A fixed stop bar 62' is provided for digit 9.

Figure 19:
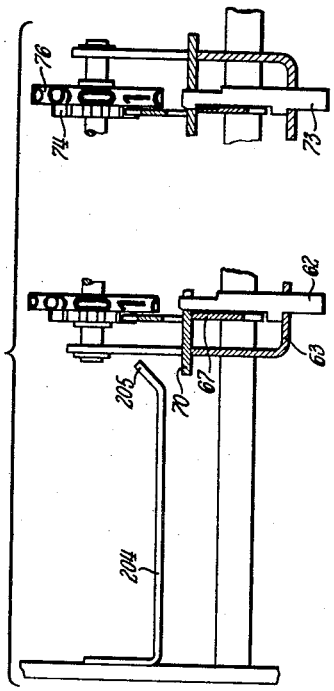
FIGURE 19 is a cross-sectional view of the pin carriage together with the entry mechanism.

Each setting pin 62 has a catch spring 66, so shaped that the setting pin is held in the pin carriage 63 in either the upper position or the lower position. The number of racks 67 corresponds to the number of positions in the set up mechanism and to the number of rows of setting pins. These racks are arranged side by side in the pin carriage. The racks 67 have slots 68 in which rides the guide rod 69 of pin carriage 63. The racks 67 also have U-shaped extensions on top, which slide along the upper guide plate 70. These racks are further guided by slots 71 cut in the pin carriage 63. As shown in FIGS. 3 and 19, the racks 67 engage gears 74, mounted on a common shaft 75 in the pin carriage. To these gears 74 are attached numeral disks 76, the surfaces of which carry numerals from 0 to 9. These numerals are visible to the operator through a slot in the case, thus enabling direct reading of entry values. As shown in FIG. 2, racks 67 are drawn by springs 77 against the setting pins 62. When in a neutral position, the racks rest with surface 72 against the front shift pins 73. These shift-pins, in an arrangement similar to that of the setting pins, have a spring 78 for holding the pins in either the upper or lower position.

When an entry value digit is selected by depressing one of the number keys 50, the shift pin 73 is pushed upward, thereby releasing the setting pin gear rack 67. Spring 77 draws the rack forward towards the setting pin 62 until its lower striking surface 79 contacts the selected setting pin.

Figures 7, 20:
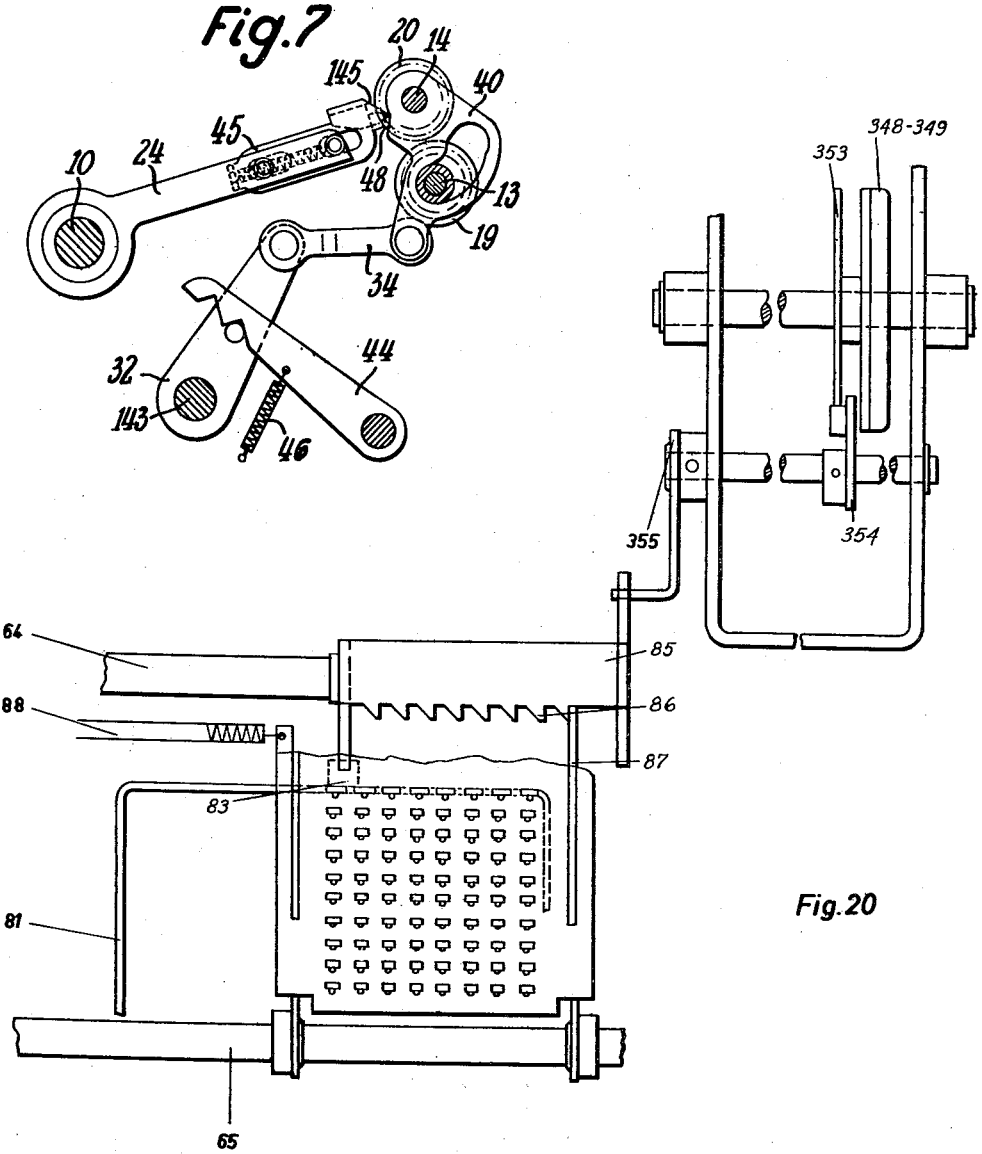
FIGURE 7 is a view of the coupler and uncoupler of the two gears of a gear set.
FIGURE 20 is a plan view of the parts shown in FIGURE 19.

As shown in FIGS. 2 and 20, on the end of rocker arm 81 which is away from number key extension 56 (i.e., towards the rear of the calculator) an extension hook 83 is mounted, which engages an arm of shift ratchet 85. The shift ratchet is mounted so as to rotate about shaft 84. The ratchet teeth 86, on the side towards the pin-carriage 63 engage with the shift extension 87 of the pin carriage. As shown in FIGS. 3 and 20, to the pin carriage is fastened a spring 88 which tends to move the pin carriage axially along the shafts 64 and 65, bringing the pin carriage shift extension 87 into contact with one of the teeth 86 of the shift ratchet 85.

Depressing a number key 50 rotates the corresponding setting pin rocker arm 57 and shift pin rocker arm 81. This in turn actuates the appropriate setting pin 62 of the row which, corresponding to the position of the pin carriage, is positioned over the rocker arm nib 61. Setting pin 62 is lifted into the path of the rack 67 involved. The shift pin rocker arm nib 80 simultaneously lifts the shifting pin 73 and thus releases the setting pin gear rack 67. The rocker arm hook 83 simultaneously lifts the engaged shift ratchet tooth 86 out of the path of the pin carriage shift extension 87 by rotating the shift ratchet 85, so that the pin carriage (under the tension of spring 88) jumps a short distance.

This movement is terminated by impact of shift pin 73 of the next row on the shift pin rocker arm nib 80.

A new entry value digit may now be selected. The nib 80 thus serves to limit the advance of the pin carriage as well as to actuate the shift pins 73. The touch-selection of entry value digits occurs in the manner conventional to ten key apparatus, by selection of the highest number first, followed by the successive digits of the entry value number.

Figure 9:
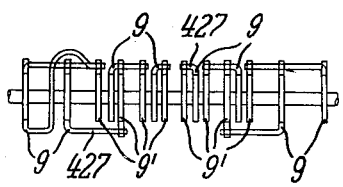
FIGURE 9 is a view of the value entry rods, showing their different forms and spacings.
Figure 10:
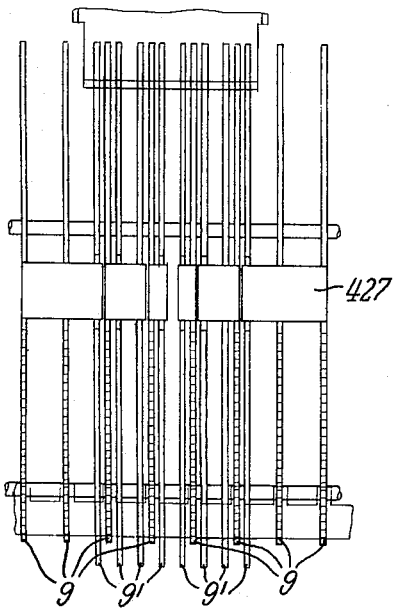
FIGURE 10 is a plan view of the parts of the mechanism shown in FIGURE 9.

Thus the position of the setting pin gear racks 67 corresponds to the selected entry value as it appears in the setting mechanism. This position of the racks 67 is transferred to the storage mechanism through the value entry rods 9, which are held against the rear end of racks 67 by the value entry rod springs 8. The distance between the several orders in the setting mechanism being smaller than that in the storage mechanism, an auxiliary value entry rod 9' is associated with each value entry rod 9. As shown in FIGS. 9 and 10, each pair of rods is connected by bow-type connectors 427. The transverse spacing of the auxiliary rods 9' corresponds exactly with the spacing of the setting pin gear racks 67. Contrary to the prior art method of accomplishing the transition from one spacing to another by bell cranks, this side by side arrangement of value entry rods 9, each connected with an auxiliary 9', has the advantage of substantially decreasing the space required.

Figure 25:
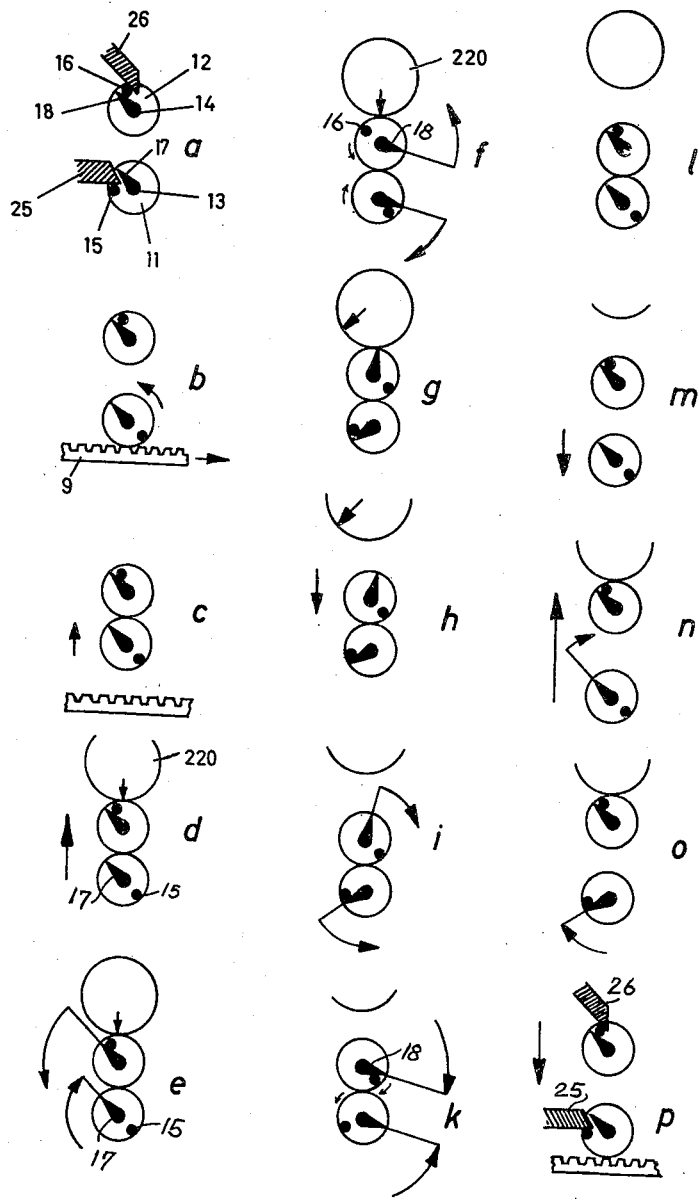

Each auxiliary rod 9' carries at its rear end a tang 195. Over these tangs 195 rides the hooked front portion of a stop plate 7, which is mounted pivotally and which holds the rods 9 and 9' in the rest position. When the stop plate is lifted, the rods 9 and 9' move forward under the tension of springs 8 until the front ends of the auxiliary rods 9' contact the rear end of the gear racks 67. This motion is transferred by the teeth of the gear rack on value entry rod 9 to the lower gears 11 of the storage mechanism. Thus the entry value is transferred to the gears 11. In addition to the eleven-tooth lower gear set 11 the storage mechanism has an upper gear set 12, which functions as a storage device. This upper gear set may be brought into engagement with the lower gear set 11. The individual gears of these gear sets turn freely on shafts 13 and 14 respectively. As shown in FIGS. 2 and 25, each gear has a lateral projection 15 and 16 respectively at the height of a tooth. Pawls 17 and 18 are fastened to shafts 13 and 14 respectively. As these shafts rotate the pawls engage the projections 15 and 16, and during subsequent rotation can cause rotation of gears 11 and 12 respectively. The upper eleven tooth gear set 12 may be brought into engagement with the primary gears 221 or 220 of a computer carriage 93. The shafts 13 and 14 are mounted to rotate in frames 23 and 24 respectively. These frames themselves are pivotally mounted on shaft 10. The frames 23 and 24 have flanges 25 and 26 respectively, running parallel to the shafts 13 and 14. The flanges have nibs which engage with the projections 15 and 16 of the gears 11 and 12 and the pawls 18 and 19 respectively.

As shown in FIG. 25a, in the rest position the pawls 17 of the lower gear set 11 are in contact with the upper side of the flange 25 which functions as a stop and the projections 15 of this gear set are in contact with the underside of flange 25 which functions as a stop. In the rest position the projections 16 of the gears 12 are held against the underside of the stop 26 by pawls 18. The gear sets 11 and 12 are out of engagement and spaced from each other in the rest position. The entry value is transferred in this position to the lower gear set 11 as outlined earlier.

Refer now to FIG. 25b. During the rotations of gears 11 in counterclockwise direction through angles corresponding to the individual digits of the entry value selected, the projection 15 on each of these gears moves in corresponding rotation away from its stop 25. By means to be described later, gear set 11 is lifted until its gear disengages from value entry rod 9 and engages with the upper gear set 12. This is shown in FIG. 25c.

As indicated in FIG. 25d, the upper gear set 12 also engages counter carriage primary gears 220 and 221. Shaft 13 is then rotated clockwise. Pawls 17, which are fastened to shaft 13, also rotate clockwise, while gears 12 rotate counter clockwise, see FIGS. 25e and 25f. After rotation through various angles, determined by the previous positions of gear wheels 11 in the various orders, each pawl 17 comes in contact with projection 15 of its appropriate gear wheel 11. Henceforward, as shown in FIG. 25g, gear wheel 11 is forced to rotate clockwise until projection 15 comes in contact with stop 25. The gear 11 thus moves only through an angle of rotation equal to its initial angular displacement; i.e., the angle between the projection 15 and stop 25 prior to the start of rotation of shaft 13. This clockwise rotation of gear 11 is transferred counter clockwise to gear 12 with which it is engaged, and simultaneously clockwise to the respective main gear 220 of the counter carriage. Thus the initial entry value is now entered into the main counter mechanism. Shaft 14 is driven counter clockwise simultaneously with shaft 13. The pawls 18 of shaft 14 do not engage the projections 16 of upper gears 12, however, since these pawls 18 first move away from projections 16 which are at a standstill between the position of FIGS. 25e and 25f, and then move at the same regular speed as projections 16 when gears 12 are turned counter clockwise by gears 11 from the position of FIG. 25f to the position of FIG. 25g. As shown in FIG. 25h, after completion of transfer of the initial entry value into the counter carriage by the engaged gear sets 11 and 12, gears 12 are disengaged from the primary gears 220 while remaining engaged with gears 11. Shafts 13 and 14 are then driven in the opposite direction so that pawl 17 turns counter clockwise and pawl 18 turns clockwise. As shown in FIG. 25k, each pawl 18 of upper gear set 12 soon contacts projection 16, after which gear 12 is also rotated. Since the gear sets 11 and 12 are mutually in engagement the last mentioned rotational movement of the gear 12 is transmitted to gear 11 until projections 16 abut stop 26 (FIG. 25l). Thus the value is again entered into the lower gear. Pawl 17 during this movement rotates at the same speed as projection 15, and does not contact it. As seen by comparison of FIG. 25l with FIG. 25c, at the end of this movement both gear sets 11 and 12 again have the same position they had immediately after the transfer of the initial entry value into the lower gear pair 11 through value entry rod 9. Thereby the initial entry value is again immediately available. This makes it possible to add it anew during multiplication to the value entered into the counter carriage. For this purpose the operational cycle described with reference to FIGS. 25d to 25l inclusive is immediately repeated.

The above described arrangement has the particular advantage in that each movement which causes the transfer of a numerical value is limited by a fixed stop. Thus, even at the highest speeds of calculation no movement can be driven by inertia beyond the point assigned to it. During value entry into the storage mechanism the value entry rods 9 rest firmly against the rear ends of setting pin gear racks 67, which in turn are held against the setting pins 62. During the transfer of a value from a lower gear 11 to an upper gear 12 and to the counter carriage the transfer movement is limited by the contact of projection 15 against the corresponding stop 25. The movement which effects the re-transfer of this value to lower gear 11 again is limited by abutment of projections 16 and pawl 18 on the corresponding stop 26.

Refer to FIG. 25m. When the entry value is to be cleared from the mechanism, both gearsets 11 and 12 will be disengaged, since the upper gear 12 already is in its cleared position. As shown in FIG. 25n, the pawl 17 of the lower gear 11 will be driven in clockwise direction to come into contact with projection 15 and to drive gear 11 into its original position shown in FIG. 25o. Thereupon (FIG. 25p) the pawl 17 is again returned to its original position.

The calculating machine of this invention is fully automatic in its operation. From the foregoing it is evident that, for the purpose of feeding entry values into the counting carriage, the following control and drive elements are required:

(1) A drive mechanism for moving pawls 17 and 18.

(2) A control mechanism for lifting and lowering the gear sets to cause the lower gear 11 to engage the value entry rod 9, and to cause the upper gear 12 to engage the primary gears 220 and 221 of the counter carriage.

(3) A control mechanism for bringing both gear sets into mesh.

*(1) Drive Mechanism for the Pawls*

Figure 6:
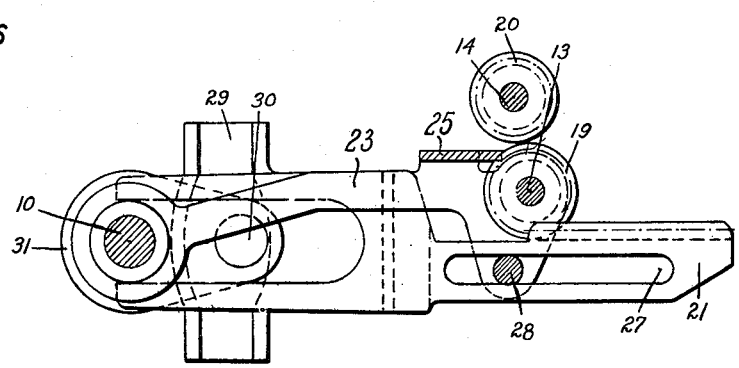
FIGURE 6 is a view of the pawl drive of the storage mechanism.

The pawls 17 and 18 are mounted on shafts 13 and 14, at the right end of which, as shown in FIGURE 6, are mounted gear wheels 19 and 20, respectively. The lower gear wheel 19 is in permanent engagement with a rack 21, which is provided with a slot 27. In this slot rides guide pin 28 of gear frame 23. The rear end of the rack has a wide fork-shaped slot, which rides over the main drive shaft 10. On rack 21 is an extension 29 which serves as a cross-slide. Roller 30, on the end of crank 31 mounted on shaft 10, moves in this cross slide. During a constant speed rotation of crank 31 rack 21 remains initially at rest, due to the particular shape of the cam-slot in the cross-slide. The rack is then moved rearwards, rests momentarily, and then moves forward. During this back and forth movement the pawls 17 rotate through 360° about shaft 13, first one way and then back.

*(2) Control Mechanism for Lifting and Lowering the Gear Sets of the Storage Mechanism*

Figure 5:
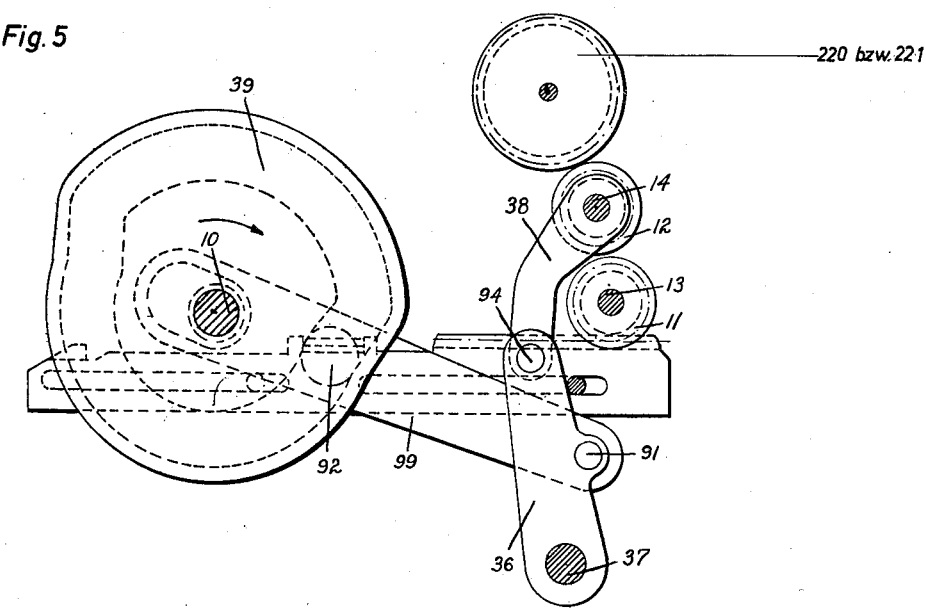
FIGURE 5 is a view of the control mechanism for engaging and disengaging the gear-sets with gears of the main counter-mechanism.

As shown in FIG. 5, to provide for engagement or disengagement of the upper gear set 12 with the primary gears of the computer mechanism or of the counter mechanism, a gear set lifting lever 36 mounted on shaft 37 is provided. At the free end of lever 36 a pin 94 pivotally supports a toggle 38, which is also linked to shaft 14 of the upper gear set 12. On the main drive shaft 10 is mounted the lifting cam 39 with a cam groove in which runs a roller 92 mounted on a slide bar 99. The slide bar has a slot at its rear end which fits over shaft 10. Its front end is pinned to lever 36 at 91. Lever 36 and toggle 38 form a toggle lever, which is driven by cam 39 via slide bar 99. When gear set 12 is in the fully lifted position, pin 94 lies on a straight line between shafts 14 and 37.

This toggle lever control has the particular advantage that the storage mechanism can always be brought firmly and surely into engagement with the counter carriage.

*(3) Control Mechanism for Coupling of Gear Sets 11 and 12*

Refer to FIGURE 7. On shaft 143 is mounted the coupling crank 32. On upper gear set shaft 14 is mounted the coupling cam 40, with its cam slot riding on lower gear set shaft 13. The free ends of coupling crank 32 and coupling cam 40 are articulated to opposite ends of link 34. At one end of the travel of coupling crank 32, the two gear sets 11 and 12 are uncoupled. When crank 32 is at the other end of its travel shaft 13 is moved such that the gear sets 11 and 12 are in engagement. Detent pawl 44, biased by spring 46, locks the coupling crank 32 at either end of its path of travel. When gear sets 11 and 12 are not in engagement, drive gear 20 (which drives pawl 18) is secured against unintentional rotation by a slide 45 engaging the teeth of this drive gear. This slide 45 runs along frame 24, and is controlled by a cam surface 48 on coupling cam 40. When the gear sets 11 and 12 are coupled together, the cam follower 145, riding on cam surface 48, pushes slide 45 back out of engagement.

II. AUTOMATIC CONTROL OF THE PARTS WHICH ENTER THE ENTRY VALUE INTO THE COMPUTING MECHANISM

Figure 4:
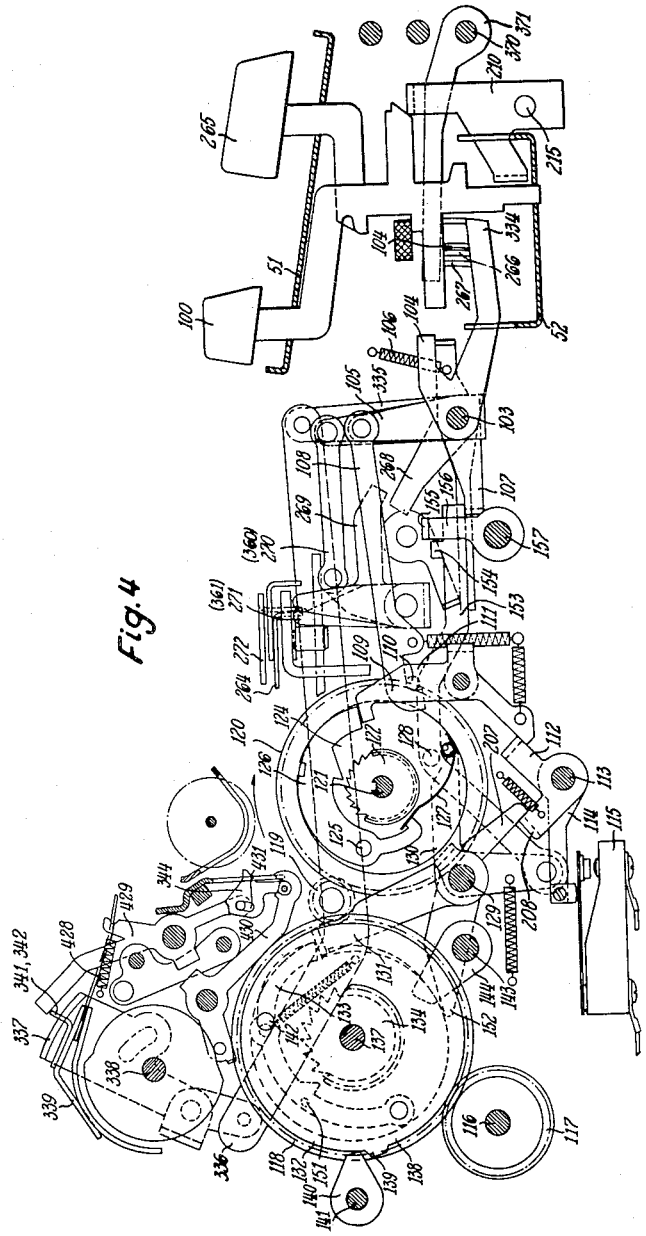
FIGURE 4 is a sectional view of the addition and gear set clutch-drive and their connection with the addition and multiplication keys.

Refer to FIGS. 4 and 5. Depressing of the addition key 100 closes the motor start switch 115 and simultaneously engages the addition clutch 122. A bolt mounted on a rotating portion of the clutch, by operation through rod 153 and associated linkage, actuates the input main clutch 134. Shaft 137 driven by clutch 134 unlocks the value entry rods 9, which then enter the selected entry value into the lower gear set. As will be described with reference to FIG. 4, rotation of shaft 137 causes motion notch-plate 138, pin 142, arm 144, shaft 143, and lever 32 to shift coupling cam 40 (FIG. 7) in the proper direction to cause engagement of gear sets 11 and 12 of the storage mechanism. As shown in FIGS. 3 and 4, a pin 151 on disk 150 (also driven by shaft 137) via other linkages actuates the storage controlling main clutch 161 shown in FIG. 8. This causes rotation of the main drive shaft 10, and also of the storage mechanism lifting cam 39 (FIG. 5) which is mounted on the main drive shaft 10. This lifts upper gear sets 12 through toggle 38, together with the lower gear sets 11 with which they are already held in mesh by member 40 (FIG. 7), into engagement with the gears 220 and 221 of the counter carriage 93. As explained with reference to FIG. 7, coupling cam 40 connects shafts 13 and 14, so that the raised shaft 14 takes along shaft 13 with gears 11 in the position of FIG. 25c. As already described with reference to FIG. 25, main shaft 10 also drives the pawls 17, 18 through necks 21 and gears 19, 20 (FIG. 6) to enter the entry values into the computer mechanism. The gear sets 11 and 12 are disengaged from the computer mechanism in the same manner, and the pawls 17 and 18, see FIGS. 2 and 25, are driven again to transfer the entry value from the upper gear set 12 into the lower gear set 11. During this operation, as soon as the lower gear set 11 is lifted from the value entry rods 9 (FIG. 25c), the value entry rods are returned into their original position by the action of cam 184 mounted on input clutch shaft 137 as shown in FIG. 2. At this point the clearing operation (to return the above components to their original positions) has begun. This will be described later, in Section III(1).

As shown in FIG. 4, depression of the addition key 100 causes pivoting of two rocker arms 104 and 334, which are mounted on a common shaft 103. Rocker arm 104 controls the addition clutch 122 to initiate the operation by which the entry value was entered into the computer mechanism since first input clutch 134 and then storage controlling clutch 161 are operated, as described above. Rocker arm 334 disengages detent 344 (see FIG. 4) which is operative only during multiplications and divisions and has no function during additions and subtractions.

Figure 12:
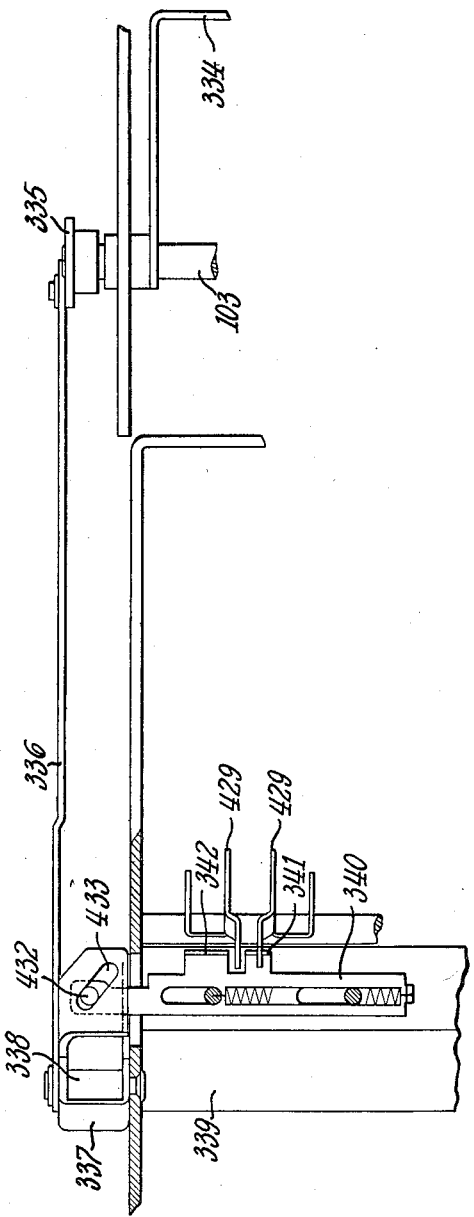
FIGURE 12 is a view of a mechanism for disengagement of the counter carriage.

Refer also to FIGURE 12. Depression of key 100, which causes a pivoting movement of the rocker arm 334, also results in movement of crank 335. This crank is attached to a connecting rod 336, on the opposite end of which is linked a bell crank 337, which is in turn mounted outside the apparatus sidewall on peg 338. On an upper traverse 339 of the apparatus housing is mounted a spring loaded slide 340. This slide is provided with tangs 341 and 342, which serve to prevent movement of the detent 344 into the counter mechanism. A tension spring 428 (FIG. 4) pulls the addition detent lever 429 (mounted in the counter mechanism) in a counterclockwise direction. This lever 429 controls another lever 430 to which is linked the addition detent 344 as shown in FIG. 4. This detent 344 is connected with lever 429 by slot 431. When tangs 341 and 342 on slider 341 prevent movement of the addition detent lever 429, the addition detent 344 is also prevented from entering the counter carriage primary gears 220 or 221, and the counter mechanism is not driven. Addition detent slide 340 projects through the apparatus side wall. At its end is a pin 432, which is guided in slot 433 of the bell crank 337.

In this embodiment of the invention two detents are utilized—one for positive and the other for negative calculating operations.

As shown in FIGURE 4, the rocker arm 104, which serves to engage the addition clutch 122, is mounted on the same shaft 103 as the addition detent rocker arm 334. The rocker arm 104 acts on one arm of a bent lever, which is mounted on a sleeve on shaft 103. This sleeve, which can oscillate relative to shaft 103, also carries crank 105. Crank 105 is linked to a pull rod 108, which has a hook shaped front end 109. This rides over pin 110 on lever 111. One arm of this lever contacts one arm of bell crank 112, which rotates with shaft 113. Another arm 114, mounted on shaft 113, actuates the electric switch 115 in the circuit of the main drive motor 90. By way of several transmission gears the motor drives the main power shaft 116. Several gears are keyed to this shaft, including the gear set clutch drive pinion 117. By means of a gear train of gears 118 and 119, gear 120 is driven. Ratchet wheel 122, a part of the addition clutch, is secured to gear wheel 120. Both rotates on shaft 121. This of itself prior art clutch has a clutch housing 123, and a clutch plate 124, which is rotatable relative to the ratchet wheel 122. On the clutch plate 124 is mounted a ratchet pawl 126 pivotally on pin 125. The ratchet pawl 126 is held against the toothed periphery of the ratchet wheel 122 by a leaf spring. In its at rest position, the motor start switch actuating lever 111 mentioned above keeps the ratchet pawl 126 out of engagement with the teeth of the ratchet wheel 122. As soon as lever 111 is rotated free of ratchet pawl 126, the pawl 126 drops into the ratchet-wheel 122, so that clutch plate 124 also rotates. A bolt 128 is mounted on plate 124; and during the rotation of clutch plate 124 it contacts a trip 130 mounted on a shaft 129, causing limited rotation of this shaft. This rotation is transferred to the actuating lever arm 131, which is thereby swung forward, releasing the ratchet pawl 133 of input main clutch 134. As with the previously described clutch, ratchet pawl 133 is mounted on a clutch plate 132. In its engaged position pawl 133 falls into ratchet wheel 134, which is fixed to a gear 135 (see FIG. 3), driven by a pinion 136 mounted on shaft 116. Refer again to FIG. 4. When the actuating lever 131 is swung out and the clutch 132, 133 and 134 thereby engaged, shaft 137 is rotated. This shaft 137 carries a notch-plate 138, whose nib 139 rotates a lever 140, mounted on shaft 141. On shaft 141 is mounted the stop plate 7 for value entry rods 9. Stop plate 7 is therefore lifted immediately upon engagement of the input main clutch 134 so that the value entry rods 9 can pick-up the entry value recorded into the pin carriage. Notch plate 138 also carries a pin 142, in the path of which is mounted an actuating arm 144. As shown in FIGS. 3 and 4, arm 144 is mounted on shaft 143. Upon a predetermined angular displacement of shaft 137 with cam 138, actuating arm 144 is swung out by pin 142 on cam 138, so that shaft 143 turns, whereby arm 32 is turned, see FIG. 7. As explained above under I(3) the coupling crank arm 32 turns coupling cam 40 so that gear sets 11 and 12 are coupled together.

Figure 8:
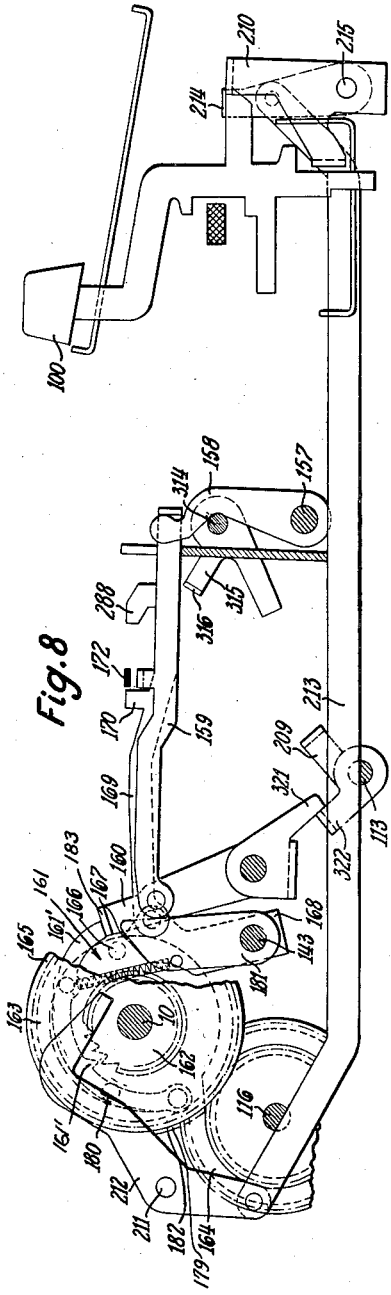
FIGURE 8 is a view of the mechanism of the main drive clutch.

As described in paragraph I(2), the storage controlling main clutch 161 controls the lifting and lowering of the gear sets 12 into engagement with the primary gears 220 and 221 of the counter carriage. This clutch is actuated through input main clutch 134. As shown in FIGS. 3 and 4, on the hub of clutch plate 132 is mounted another plate 150, which carries a pin 151. One arm of a bell crank 152 is positioned in the path of pin 151. The bell crank is mounted pivotally on shaft 129. The other arm of the bell crank is linked to push rod 153, which runs forward toward the function keys. An extension 107 is provided on rocker arm 104, which is pivoted on shaft 103. On another arm of this extension 107 a spring 106 is provided. This maintains the rocker arm 104 in its rest-position. The extension 107 reaches under the front end of the push rod 153, such that this end is lifted upon depression of the addition key 100. A tang 154 on push rod 153 is thereby brought into contact with the tang 155 of lever arm 156 mounted on shaft 157. When pin 151 is driven by input main clutch 134 into contact with bell crank 152, push rod 153 is moved forward, moving lever arm 156 and transmitting a rotation to shaft 157. As shown in FIG. 8, on the other end of shaft 157 is mounted crank 158. This operates on pull rod 159, which is linked to the trip lever 160. When pin 151 contacts the arm of the push rod bell crank 152, the trip lever 160 releases the main drive clutch pawl 161′, which rests against it. Thus the pawl engages the teeth of the ratchet wheel 162. This ratchet wheel 162 is connected to the drive gear 163, which is driven from the main power shaft 116 through gear 164. When the main drive clutch 161 is engaged, clutch plate 165, on which pawl 161′ is mounted, drives the main drive shaft 10. As shown in FIG. 5, to this shaft is connected lifting cam 39, which controls the lifting and lowering of upper gear set 12, as described in I(2).

As described in paragraph I(1), the pawls 17 and 18 are driven by the main drive shaft 10, over cross-slide 29. The lifting cam 39 and the cross-slide 29 are arranged relative to each other on the main drive shaft 10 in such a manner, that, depending on the angular position of the main shaft 10, the following operational steps occur:

*Rotation up to 30°.*—The coupled gear sets 11 and 12 are brought into engagement with the gears 220, 221 of the main counter mechanism.

*Rotation up to 150°.*—The pawls 17 and 18 are rotated in the proper direction to transfer the entry value into the main counter mechanism as explained with reference to FIG. 25.

*Rotation up to 180°.*—The gear sets 11, 12 are disengaged from the main counter mechanism.

*Rotation up to 360°.*—The pawls 17, 18 rotate in the opposite direction. The upper gears 12 are thereby returned to zero setting and the entry value is re-transferred to the lower gear 11.

III.—CLEARANCE OF THE STORAGE MECHANISM AND RETURN OF THE VARIOUS MEMBERS INTO THEIR ORIGINAL POSITIONS

(1) Clearing the Storage Mechanism

Upon completion of a calculation, the storage mechanism is in the position shown in FIGURE 25*l*. The entry value has been re-entered into the lower gear set 11; the pawls are in the original positions; gear sets 11 and 12 are coupled together, but are out of engagement with the computer carriage primary gears 220 and 221. In order to clear (or cancel) the value entered into the lower gear set 11, the clearing main clutch 175 is used which includes a ratchet wheel 175' and a clutch plate 176 supporting a pawl 174 cooperating with ratchet wheel 175'. As shown in FIG. 8, this is actuated from pin 180 on the clutch plate of the storage controlling main clutch 161. Pin 180, via an attached crank, causes rotation of shaft 143, which actuates coupling cam 40, which in turn causes uncoupling of the two gear sets 11 and 12 as shown in FIGURE 25*m*. During uncoupling, however, the lower gear set 11 engages the value entry rods 9. Therefore, the uncoupled gear sets 11 and 12 must be lifted, as shown in FIG. 25*n*, in order to bring the upper gear set 12 into engagement with the gears 220, 221 of the calculator carriage. The lower gear set 11 set is now free and may be returned to zero position by the lower pawl 17, as shown in FIG. 25*o*. The gear sets are again lowered until the lower gear set 11 again engages the value entry rods 9. Thus the value entry rods are ready to receive a new entry value, which in the meantime has been entered via the number keys into the pin carriage. Meanwhile, the pawls 17 of the lower gear set return to their initial position, as shown in FIG. 25*p*.

Automatic clearance occurs generally as follows (refer to FIGS. 3 and 8): There is a pin 166 on the clutch plate 165 of the storage controlling main clutch 161. In the path of this pin 166 is beveled surface 167 of lever arm 168. Arm 168 is pivotally mounted on shaft 143 and is linked to rod 169, which carries a square projection 170. This projection is in close proximity to tang 172 on push rod 171. Tang 172 runs transverse to parallel rods 169 and 171.

The end of push rod 171 is linked to trip lever 173 of clearing main clutch 175, which lever keeps the ratchet pawl 174 out of engagement with the ratchet wheel 175. This ratchet wheel 175' is driven by the main power shaft 116 via gears 177 and 178. On the hub of the clutch plate 176 (which carries the ratchet pawl 174) is also keyed a cam 179, which carries the uncoupling actuating pin 180, shown in FIGS. 3 and 8. In the path of pin 180 is arranged an arm 181, keyed to shaft 143. Thus, as shown in FIGURE 7, the engaged clutch 175 rotates shaft 143, which actuates the shaft uncoupling cam 40, and thus uncouples gear sets 11 and 12.

As shown in FIGS. 3*c* and 8, trip lever 160 of the main drive clutch 161 has a perpendicular tang 183, which protrudes into the path of projection 182 of the cam plate 179. As the clearing main clutch 175 turns and the cam plate projection 182 actuates the trip lever 160, the storage controlling main clutch 161 is again engaged. The operation described in Part II above is repeated except for the difference that the two gearsets 11 and 12 remain disengaged from each other. Thus, in sequence, both gearsets are lifted, the pawl 17 is driven, the gear sets are lowered again, and the pawls 17, 18 are in their original positions. Since the gear sets 11 and 12 are disengaged, gears 19 and 20 are also disengaged and pawl 18 is not driven.

(2) Return of the Value Entry Rods 9 to Their Initial Positions

As soon as the lower gear set 11 is lifted from the value entry rods 9, these rods are returned to their initial positions. Thus a new value may be entered into the pin carriage, as long as the machine is in operation. The return of the setting pin gear racks 67 is accomplished via shaft 137, which is driven by the gear set clutch 134. The value entry rod return cam 184 is mounted on shaft 137 as shown in FIGURE 3 and in broken lines in FIGURE 2. On the periphery of cam 184 rides a roller 184', mounted on a double armed lever 185, which is pivotally mounted on pin 186 in the housing of the apparatus. On the end of lever 185 away from roller 184 is linked a connecting rod 187, the other end of which in turn is linked to crank 188 mounted on shaft 189. As shown in FIG. 2, two other arms 190 are mounted on shaft 189. These end in open slots 191, in which ride pegs 192 of yoke 193. This yoke 193 is so shaped that it can engage the tangs 194 of the setting pin gear racks 67 of the pin carriage. Thus when the gear set clutch 134 is engaged, yoke 193 is moved backward by arms 190, carrying with it tangs 194 of the setting pin gear racks 67. Value entry rods 9 ride against the rear ends of gear racks 67; hence these too return to their original positions. After arrival in their original positions, value entry rods 9 are retained by engagement of stop plate 7 over tangs 195.

The gear racks 67 have a slant surface underneath their front ends, which serves to push the shift pins 73 downwards to their original positions. In this position the upper striking surfaces 72 of the gear racks 67 rest against the shift pins 73 since the recess, through which these ends of the gear racks 67 had moved in the operating position, has now been pushed downwards.

(3) Return of the Pin Carriage to Its Initial Position

On shaft 137, which is driven by gear set clutch 134, is mounted still another cam 196, shown in FIG. 2 in dotted lines, and in FIG. 3. A cam follower on crank 197 rides on this cam. Crank 197 is pivotally mounted on pin 198 and a push rod 199 is linked to it. The other end of push rod 199 is linked to an arm of a bell crank 200. To the other arm of bell crank 200 is linked a pin carriage return rod 201 as shown in FIG. 3. The extremity of this rod is bent over 90°, through which is a hole in which rides the pin carriage cross shaft 65. After a predetermined rotation of shaft 137 a movement is imparted to the cam follower crank 197. This is transferred by the bell crank 200 to the return rod 201 in such a manner that the pin carriage is returned to its initial position.

As best seen in FIG. 19, the setting pins 62 are lowered to their original positions by a wiper rail 204, whose end 205 is bent at an appropriate angle to depress the setting pins to their original positions during the return of the pin carriage.

(4) Clearing a Depressed Function Key

Refer to FIGS. 4 and 8. A depressed function key rests in a catch 210. The function keys are released only when cancellation clutch 175 is engaged. Actuating pin 180, which via appropriate linkages initiated uncoupling of the gear sets, later runs against an angular arm of lever 212, mounted on pin 211. On the other arm of lever 212 is linked a pull rod 213, which extends from front to rear of the entire calculator. The other end of pull rod 213 is linked to crank 214 mounted on shaft 215. Function key catch 210 is mounted on shaft 215, so that when this shaft is rotated, the function key is released.

(5) Electric Motor Switch Operation

In II above was described a sequence of operations for closing the electrical start switch 115 of motor 90. It was outlined that this switch was actuated by actuating lever 111 on the addition clutch 122 by rotation of shaft 113. In a similar manner, all other function keys of the apparatus work upon other cranks mounted on shaft 113. Actuating levers driven by the clutch 161, clutch 175, and all other clutches of the apparatus control shaft 113, so that start switch 115 remains closed as long as any one of these clutches is engaged.

IV.—THE COMPUTER CARRIAGE

Figure 17:
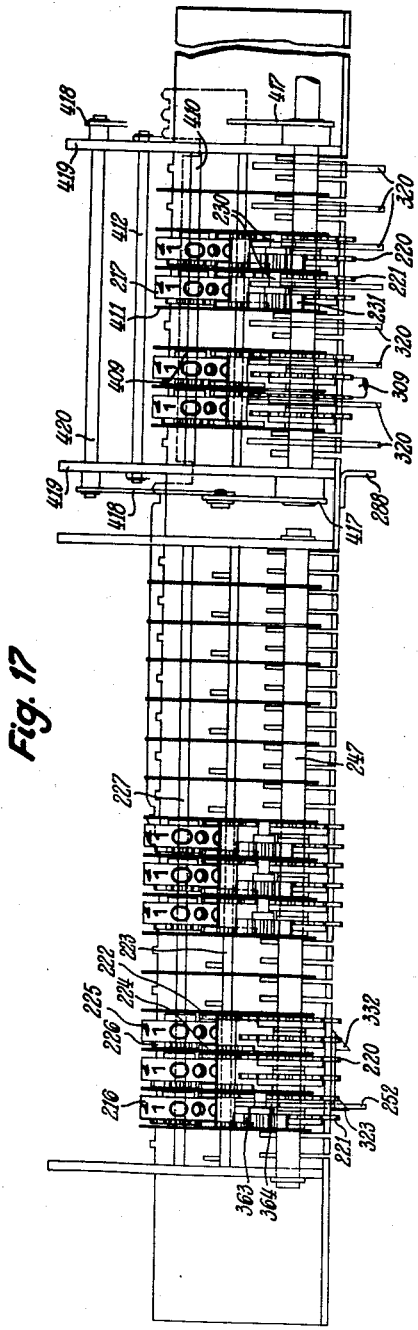
FIGURE 17 is a plan view of the computer carriage.

The computer carriage 93 is best seen in FIGS. 1 and 2 and comprises the calculating mechanism 216 and the counter mechanism 217. The computer carriage is mounted on a shaft 218 and on rollers 219. It has a bent sheet metal frame, in which is mounted shaft 247 with its primary gears and two cams 22. Alternately on shaft 247 are arranged the primary gears 220 for addition and primary gears 221 for subtraction. Refer to FIGURES 2 and 17. The teeth of primary gear 220 mesh with gear 222. The two gears 222 and 224 are connected by a common hub, mounted to rotate on shaft 223. Gear 224 meshes with the number wheel gear 226 on shaft 227. Number wheel gear 226 is fastened to the number wheel 225. Pawl 229, actuated by spring 228 engages a tooth of gear 226 to guard against unintentional rotation of the number wheel and the gears connected therewith. Primary gear 221 for subtraction meshes with the intermediate gear 231 mounted on shaft 230. Gear 231 rotation is transmitted finally to one of the gears 224. With gears 220 and 221 rotating in the same direction, the intermediate gear 231 reverses the rotation of the number wheel 225, as compared to the direction in which it rotates during addition.

Figure 13:
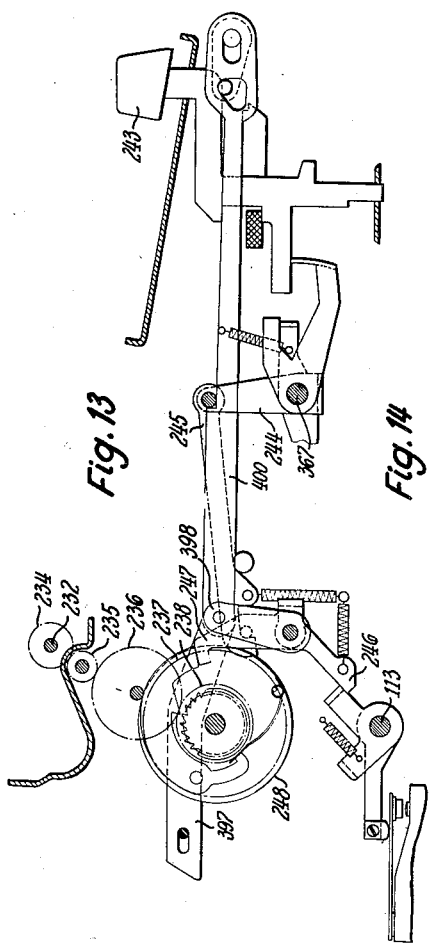
FIGURE 13 is a view of the calculating mechanism clutch and associated members.

The cancellation of the values entered into the calculating mechanism and the counter mechanism is accomplished by clearing gears 233 known to the prior art. The clearing gears 233 are mounted on shaft 232 and engage the gears 231. In addition, gears 234 are also mounted on shaft 232 as shown in FIG. 13. A very long idler gear 235 is mounted in the apparatus housing, such that it engages gears 234 in every position of the carriage. Gear 235 is coupled with gears 236, 237 and 238 by means of a clutch similar to those previously discussed. Clutch shaft 239 is driven directly from the motor drive shaft 242 by means of worm gears 240 and 241 as shown in FIG. 3c. As shown in FIGURE 13, depression of clearing key 243 for the calculating mechanism is transmitted via crank 244 and pull rod 245 to cause rotation of the trip lever 247a. Thus the clutch plate 248 and the gear 237 connected therewith are rotated and the calculating mechanism is returned to zero via the above described gears and linkages.

A corresponding mechanism is provided for the counter mechanism.

A spring 251, see FIG. 15, pulls the computer carriage to the left, as viewed from the front of the machine. As shown in FIGS. 2 and 21, a ratchet pawl 252 is mounted pivotally on the computer carriage. The pawl 252 engages ratchet teeth 253 of ratchet 246, mounted on the apparatus case. This holds the carriage in a steady position against the pull of spring 251.

V.—ADDITION

During addition the computer carriage is in a position in which pawl 252 rests against the largest tooth 253, at the end of the carriage return ratchet 264. By depression of the addition key 100 the entry value is transferred to the primary gears 220, as described above in paragraphs I and II. The clearing operations described in paragraph III follow thereafter. This restores the pin carriage and the storage mechanism to zero position, but retains the entered value in the calculating mechanism.

The next number is then entered into the pin carriage, transferred to the storage mechanism, and again transferred to the calculating mechanism. This last step adds the new number to the already existing number in the calculating mechanism.

The addition cycle requires the actuation of four clutches. This occurs automatically, however, upon depression of the addition key. Contrary to the prior art calculators, which require a separate electrical contact for every engagement of a clutch, the embodiment of the present invention requires only a single switch for all operational cycles of the apparatus.

VI.—SUBTRACTION

Subtraction is accomplished in substantially the same manner as addition, except that the computer carriage must be moved so that instead of the addition gears 220, the subtraction gears 221 engage the upper gear sets 12 of the storage mechanism. This movement of the computer carriage is accomplished as follows (see FIG. 18): Depressing the subtraction key 254 engages a subtraction clutch 257 by means of rod linkages similar to those previously described. The subtraction clutch 257 drives a cam 259, which causes an appropriate movement of the ratchet 264, thus moving the counter carriage. Simultaneously, the same transfer and cancellation functions are accomplished as were accomplished by the depression of the addition key 100.

The movement of the computer carriage in such a manner as to permit engagement of the subtraction gears 221 with the upper gear set 12 occurs as follows (refer to FIG. 18): Depression of the subtraction key 254 swings bell crank 255, causing a pull rod 256 linked to bell crank 255 to disengage the pawl trip for subtraction clutch 257. Clutch rotation drives the cam 259, which is fixed to clutch plate 258.

A roller cam follower 260 rides on cam 259. As shown in FIGS. 18 and 21 the free end of cam follower 260, adjacent to the roller, actuates a push-rod 261 running in a horizontal direction. The push rod 261 has a slant surface 262 on which rides a roller 263 mounted near the end of the slide ratchet 264. The ratchet teeth, of which the end tooth 253 is largest, are on the end opposite roller 263. Pawl 262 of the computer carriage engages this ratchet 264. When the cam follower 260 is moved outwards by cam 259, this motion is transferred to ratchet 264 through pushrod 261 and its wedge-shaped slant surface 262. The ratchet 264 thereby moves the computer carriage into the subtraction position. The slide ratchet 264 is guided by means of a guide slot over the fixed guide pin 149. Depression of the subtraction key 254 simultaneously actuates the switch crank 105 (FIG. 16) so that the same operations described above under paragraph V for the addition operation are performed.

VII.—MULTIPLICATION

The main advantage of the calculating machine of the present invention lies in the fact that multiplication is fully automatic.

The machine is so controlled that first the multiplier is entered into the counter mechanism and thereafter the multiplicand into the storage mechanism. Since the apparatus of the present invention performs multiplication by repetitive addition, the multiplicand is entered into the calculating mechanism as many times as is demanded by the multiplier in the counter mechanism. It is advantageous to begin the multiplication with the highest order.

To enter the multiplier into the counter mechanism the computer carriage is moved to the left until the upper gear set 12 engages the gears 220 of the counter mechanism. To accomplish this, the ratchet teeth of ratchet 264 are removed from the path of ratchet pawl 252 to permit movement of the carriage to the left a fixed stop 288 terminates this movement. Thereafter the multiplier is entered into the counter mechanism by the operation cycles previously described.

In the following operation cycle, the computer carriage is returned to its original position by means of a draw-string driven by the carriage return clutch 296. The entry value (multiplicand) is then entered into the storage mechanism, and from there into the calculating mechanism as many times as the multiplier in the counter mechanism demands. The counter carriage is actually returned a small distance past its original position to permit initiation of the multiplication by the multilever 320 on the notches 319 of the multiplication lever 318.

In contrast to the operation cycles previously described, during multiplication the main clutch 161 is not actuated by the input clutch 134, but rather by rod linkage from the computer carriage. The multiplicand is now transferred into the calculating mechanism as often as the intial digit of the multiplier in the counter carriage demands; that is, until a detent returns to its zero position. The computer carriage tends to be drawn to the left by spring action, but is held in position by a multiplication hook 312, which is positioned by the outer end of one of multilevers 320. As soon as one order returns to zero, the engaged lever 330 releases the multiplication hook 312; and the computer carriage jumps to the next digit position.

Upon completion of the calculation operation at the last digit position, a precancellation clutch 327 is actuated, which returns the computer carriage, which was moved to the left by the calculations at the various digit positions, back to its original position. Thereupon the cancellation clutch 175 is actuated whereby the previously described cancellation operations are initiated as follows:

*(1) Entry of the Multiplier*

Refer to FIGURES 3 and 4. Upon entry of the multiplier into the pin carriage, the multiplication (×) key 265 will be depressed, which causes pivoting of the rocket arms 266 and 267. Refer also to FIG. 21. An extension 268 of rocker arm 267 actuates the bent lever 269, whose other arm engages the computer carriage ratchet slide 264, swinging the toothed end out of engagement with the ratchet pawl 252. This allows the computer carriage 93 to be drawn to the left by a pulley and string drive 305, 306, 307, 308 actuated by a spiral spring 251 as best seen in FIG. 15. Stop 288 on the computer carriage (see FIG. 17) engages hook 274 (see FIG. 14) which is positioned in the path of the stop. This arrests the leftward movement of the computer carriage 93. Hook 274 was moved into the path of the stop bar as follows (refer also to FIG. 4).

Upon depression of the × key 265, another arm of rocker arm 266 actuates linkages 270 and 271, which further actuate a ratchet hook 273. Hook 273 is mounted pivotally on a control guide 272 which is movable in its longitudinal direction. The engagement surface of the free end of the hook 273 is designated in FIGURE 14 as 274.

Figure 14:
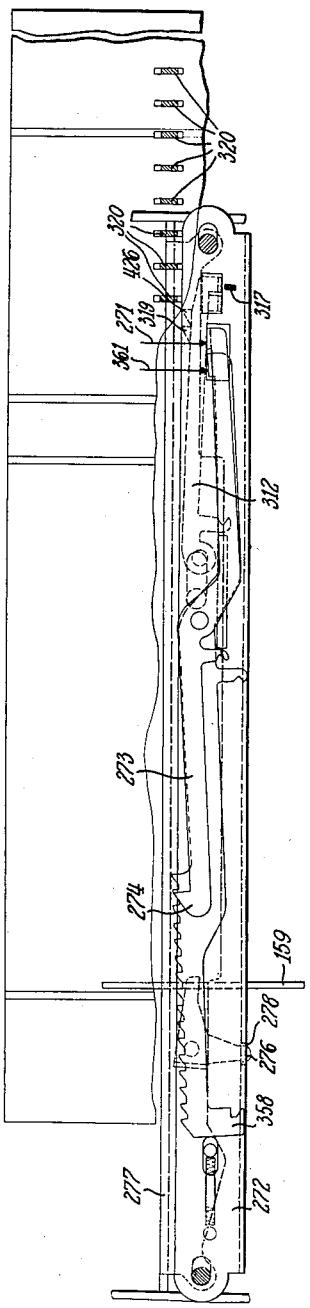
FIGURE 14 is a view of the control guide with the entry- and multiplication-hooks and of the division guide.

The rocker arm 267 is so designed that it will contact an angular projection of crank 105, in order that the entry value (multiplier) will be entered into the shifting mechanism. Engagement of the storage controlling main clutch 161, however, is not initiated by action of the push rod 153 on lever arm 156, shaft 157, since push rod 153 has not been lifted by the rocker arm extension 107 of clutch 122 to enable push rod 153 to engage tang 155 of lever arm 156. Instead, for the multiplication operation, the main clutch 161 is actuated directly from the computer carriage. Refer to FIG. 14. When stop 288 of the computer carriage engages the contact surface 274 of the arresting hook 273, the control guide 272 (on which hook 273 is mounted) is moved a short distance to the left, in the direction of the movement of the computer carriage. Guide rail 272 has a small slot 278, in which rides the end of an arm of the actuating crank 276. Movement of control guide 272 rotates crank 276. The other arm of crank 276 engages a tang on pull rod 159, which thus draws trip lever 160 from under the clutch pawl 161' of the main clutch 161. Thus clutch 161 is engaged, the gear sets 11, 12 are lifted and lowered as described in paragraphs I(2) and I(3) and the pawls 17 and 18 are driven. The clearing main clutch 175 is then actuated by the storage controlling main clutch 161, so that the multiplier is cleared from the storage mechanism.

*(2) Entry of the Multiplicand*

Refer to FIGS. 3 and 16. Upon entry of the multiplicand into the pin carriage the multiplication (×=) key 290 is depressed. This rotates two rocker arms 291 and 292. Rocker arm 291 actuates pull rod 293, which is linked to trip lever 294 for ratchet pawl 295 of the carriage return clutch 296. This clutch is driven by shaft 116 via gears 297 and 298. Gear 300, mounted on the hub of clutch plate 299 drives gear 301 on shaft 302. A small pulley 305 (see FIG. 3) is driven by a pair of gears 303 and 304 mounted on the side of the apparatus housing as shown in FIGS. 3 and 15. Over pulley 305 and guide pulleys 307 and 308 runs a rope 306 which returns the computer carriage 93 from its position after entry of the multiplier to its original position. Towards the end of the return movement, bolt 309 mounted on the computer carriage engages lever 310 mounted on the apparatus housing. The other arm of lever 310 rides in a slot of a pull rod 293 and lifts it so that trip lever 294 can enter the path of pawl 295 of the carriage return clutch 296 and terminate the return movement of the carriage.

Rocker arm 292 is fashioned in such a manner that it is linked via arm 311 and a bridge to rocker arm 104 of clutch 122. Thus when the multiplication (×=) key 290 is depressed rocker arm 104 is also actuated and the addition clutch 122 and thereafter input main clutch 134 are actuated in the manner previously described.

On actuating rocker arm 292 there is an additional arm 313 which actuates crank 315 mounted on shaft 64. Shaft 64, which runs transversely across the entire machine, is one of the shafts on which the pin carriage 63 is movably mounted. At its other end is mounted a crank 313, with a 90° tang which contacts the push rod 171 of clearing main clutch 175. Depression of the multiplication key (×=) 290 thus also actuates push rod 171 so that the linkage between the main clutch 161 and main clutch 175 is disconnected, and clutch 175 is therefore not actuated by the clutch 161. The entry value thus remains in the storage mechanism after its transfer to the calculating mechanism and after re-transfer from the accumulator 12 to gear set 11 in the storage mechanism.

As shown in FIGS. 3 and 16, rocker arm 292 also has an extension 318 which contacts one arm of a double armed crank 317. The other arm of crank 317 projects upwards to engage multiplication hook 312, mounted pivotally on control guide 272 as shown in FIG. 14. Multiplication hook 312 has a tooth 319 which enters the path of the first multilever 320. The computer carriage, upon entry of the multiplier into the counter mechanism, is brought back into its original position by means of the carriage return clutch.

As soon as the carriage return clutch 296, see FIG. 16, is disengaged, the carriage return spring 251 is effective and pulls the counter carriage 93 to the left by means of the pulley and rope drive 305, 306 as best seen in FIG. 15. The first multilever 320 thereupon engages the multiplication hook tooth 319. Since tooth 319 is mounted on control guide 272, the rail is so moved that the main drive clutch 161 (see FIG. 8) is actuated by means of the actuating crank 276 as best seen in FIG. 14.

When main clutch 161 is closed (FIG. 8), motor switch is closed since lever 160 of clutch 161 acts with its arm 321 on an arm 322 secured to shaft 113. Turning of shaft 113 turns lever 114 which closes switch 115.

As described in paragraph III, gear sets 11 and 12 of the storage mechanism are disengaged by rotation of a crank mounted on shaft 143, actuated by pin 180 on clutch 175. However, since the cancellation clutch 175 cannot be actuated by clutch 161, due to interruption of the connecting linkage 171 by depression of the multiplication key, gear sets 11 and 12 of the storage mechanism remain in engagement. Thus, during each rotation of the main shaft 10, the entry value is again added into the calculating mechanism, and then again transferred into the lower gear set 11 by the upper gear set 17. The entry value thus again stands ready for entry into the calculating mechanism and simultaneously into the accumulator gear set 12 during the next rotation.

Figure 22:
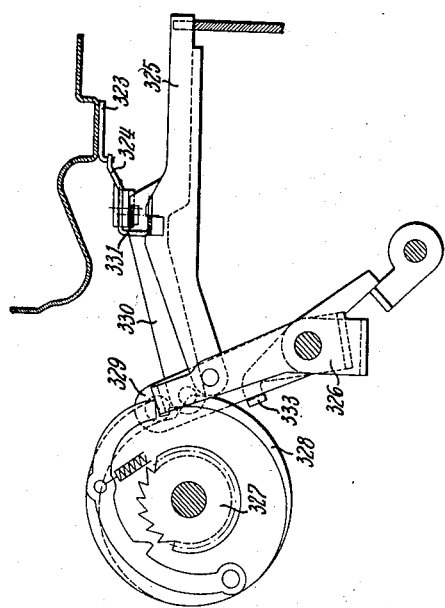
FIGURE 22 is a view of a mechanism for disengaging the apparatus to its original position upon completion of the calculating operation.

As best seen in FIG. 4, while clutch 161 is engaged, the addition detent 344 is actuated once each revolution, in a manner known to the prior art, unless, as during addition or subtraction, it is disengaged. Thus, each revolution this addition detent reduces by one the number in the operating digital position of the counter mechanism until the counter wheel of the order is turned number is rolled back to zero. As shown in FIG. 2, a projecting member 321 on an intermediate wheel 231 of counter mechanism 217 (FIGS. 1 and 17) turns the multilever 320 (FIGS. 2 and 14) so that the free end of this multilever 320 is thus disengaged from tooth 319 of the multiplication hook 312. This permits the control guide to move back to its rest position, thereby operating (by actuation of actuating crank 276 and pull rod 159) the trip lever 160 of main clutch 161 to disengage clutch 161. The computer carriage, is pulled a bit further by spring 251, so that the next multilever engages tooth 319 of the multiplication hook 312. Refer now to FIGS. 3, 17 and 22.

After the calculation in the last position of the multiplier is completed, the computer carriage makes one more small jump so that the tang 323 mounted near the left end of the counter carriage (in the vicinity of ratchet pawl 252) engages one arm of bell crank 324, which is pivotally mounted on a vertical axis.

The other arm of bell crank 324 rides in a slot in a pull rod 325 hinged to the trip lever 326 of the pre-cancellation clutch 327. The pre-cancellation clutch 327 drives a cam plate 328 on which rides cam follower 329, to which push rod 330 is linked. One arm of a second bell crank 331, mounted on a vertical axis, rides in a slot in push rod 330. The other arm of bell crank 331 engages a tang 332 on the computer carriage and returns the computer carriage to its rest position. In the same manner as described earlier for the clearing main clutch 175 the pre-cancellation clutch 327 releases the function keys. This, however, also causes the return of the bent lever 269 to its original position so that the computer carriage ratchet 264 and, in particular, tooth 253, are again swung into position to engage the ratchet pawl 252.

The clearing main clutch 175 is immediately released by the pre-cancellation clutch 327. Cam follower 329, which rides on the cam plate 328 driven by the pre-cancellation clutch 327, has a tang 333 which engages trip lever 173 of the cancellation clutch 175. The cancellation clutch is thus engaged, which initiates the clearance of the shifting mechanism, as described in paragraph III. The multiplication result is read from the calculating mechanism number wheels.

VIII.—DIVISION

For division the dividend is entered into the calculating mechanism and the quotient appears in the counter mechanism. The basic difference between the division operation and the multiplication operation is that the value (divisor) entered in the storage mechanism is repeatedly deducted from the value (dividend) entered in the calculating mechanism. The number of these subtractions (quotient) appears in the counter mechanism. Other changes relative to the multiplication operation result from the fact that the dividend is entered on the left side and not on the right side of the calculating mechanism. Further, instead of the addition primary gears 220, the subtraction primary gears 221 of the calculating mechanism are engaged; and finally an addition operation is interposed between the subtractions at each movement of the counter carriage to a new digital position.

(1) Entry of the Dividend

Figure 11:
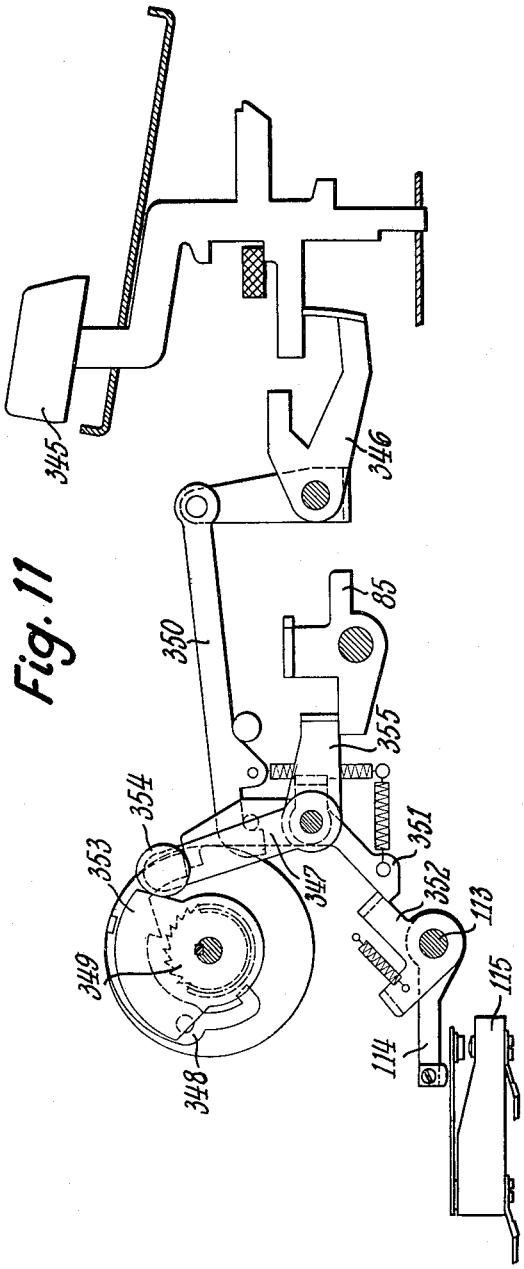
FIGURE 11 is a view of the division clutch and its connection with the division key.

Refer to FIG. 11. The division key 345 actuates the rocker arms 334, 346, 266 and 291.

During entry of the dividend into the calculating mechanism, in the manner previously described in paragraph V, the addition detent for actuation of the counter mechanism is held out of operation by rocker arm 334. This arrangement avoids the additional operation by a lever subsequent to the entry of the dividend, which is required by calculators of the prior art.

The dividend is entered on the left side of the calculating mechanism in order to provide a sufficient number of decimal positions during the division operation. To this end the pin carriage 63 is brought into its extreme left position and the computer carriage into its extreme right position.

Rocker arm 346, actuated by the division key 345, releases a division clutch 349 which moves the pin carriage 63 to its extreme left position. To accomplish this, rocker arm 346 actuates pull rod 350, the other end of which is linked to trip lever 347, which trips pawl 348 of the division clutch 349. The lower arm of trip lever 347 engages bell crank 352 mounted on shaft 113. By rotation of the shaft 113 the electric switch 115 is closed in a manner known to the prior art. Thus the clutch 349 is driven by the main power shaft 116 via intermediate gears. As shown in FIGURES 3 and 11 the division clutch 349 drives a cam plate 353 on which rides the cam follower 354. Cam follower 354 rotates a shaft on which crank 355 is mounted. Crank 355 engages one arm of ratchet 85, rotating it in such a manner that the ratchet teeth 86 are moved out of reach of shift extension 87 of the pin carriage.

Spring 88 then pulls the pin carriage longitudinally on the two shafts 64 and 65 to its extreme left position. The division key also actuates rocker arm 291, which in turn actuates the carriage return clutch 296, as described in paragraph VII(2). Thus the computer carriage is moved all the way to the right, until the carriage return clutch 296 is opened by contact of the computer carriage with the carriage return termination lever 310, as described in paragraph VII(2).

Meanwhile, rocker arm 266, which also is actuated by the division key 345, operates via connecting rod 270 and actuating lever 271 to swing out the carriage arresting hook 273. (Refer to the description of paragraph VII(1). In contrast to the multiplication operation, this hook is not engaged by the fixed stop at the left edge of the counter mechanism, but rather by ratchet pawl 252 at the left edge of the calculating mechanism, as the computer carriage is drawn to the left by spring 251 when the carriage return clutch 296 is disengaged. Contact of pawl 252 on contact surface 274 of the arresting hook 273 slides the control guide 272 towards the left again.

This actuates the main clutch 161, and thereafter the clearing clutch 175 in the manner already described in paragraph VIII(1).

Rocker arm 266 is connected with the crank 105, as previously outlined, so that depression of the division key 345 also actuates the addition clutch 122 and input clutch 134. Thus the entry value is transferred from the pin carriage into the storage mechanism.

(2) Entry of the Divisor

Upon completion of the entry of the dividend, the pin carriage is returned to its original position. The computer carriage remains in its right-hand position. When the divisor has been entered into the machine via the number keys, the division (:=) key 357 is depressed, thereby actuating rocker arms 346, 267 and 359.

Rocker arm 346 again actuates engagement of the division clutch 347, so that the pin carriage 63 can slide to its extreme left-hand position.

Actuation of rocker arm 267 rotates the computer carriage ratchet out of the path of pawl 252, as previously described in paragraph VII(1).

As previously described, rocker arm 267 also actuates switch crank 105, so that the addition and gear set clutches are engaged. Thus the entry value is entered into the extreme left-hand side of the shifting mechanism.

Rocker arm 359 actuates pull rod 360 and crank 361, the latter two of which are similar to parts 270 and 271 shown in FIGURE 4. This swings the division ratchet 358 (which is mounted on a vertical axis on the control guide 272) into the path of pawl 252 on the computer carriage. Prior to this the computer carriage had been driven to its extreme right position by the carriage return clutch in the manner above described.

As shown in FIGURE 16, rocker arm 359 has an arm 362 which runs in parallel to arm 313, and which operates on crank 315 on the pin carriage main shaft 64. Rotation of arm 362 breaks the linkage by which the main drive clutch 161 actuates the cancellation clutch 175.

The first tooth of the division ratchet 358 is offset relative to contact surface 274 of the carriage arresting hook 273 in such a manner that when contact is established between pawl 252 and the first tooth of the division ratchet 358, the subtraction gears 221 of the calculating mechanism are positioned over the gears 12 of the storage mechanism.

Contact of pawl 252 with the division ratchet 358 will longitudinally displace the control guide 272 such that the main clutch 134 is engaged, as had been previously described. Refer now to FIGS. 2, 14 and 17. The numerical value (divisor) present in the storage mechanism is now repeatedly deducted from the numerical value (dividend) present in the calculating mechanism, until the tang 364 mounted on gear 363 rotates the ratchet pawl 252 out of contact with the first tooth of the division ratchet 358. (The shape of the ratchet pawl 252 and of the tang 364 mounted on gear 363 rotates the ratchet pawl and tang 321.) The counter carriage 93, under the tension of spring 151, can now make a step to the next tooth of the division ratchet 358. This results in bringing the addition gears 220 (of the same digital position as the subtraction gears 221 formerly in operation) into line with the upper gear set 12 of the storage mechanism. The value in the storage mechanism is now positively entered into the counter mechanism. The tang of gear 363 immediately again actuates pawl 252, so that the computer carriage jumps into the subtraction position of the next lower order.

Subtraction takes place in a given order until the zero position has been passed. In manual division with pencil and paper, when one sees that he has subtracted the divisor from the initial digits of the dividend as often as possible without obtaining a remainder less than zero, he must bring an additional digit into play. Similarly, the mechanism of the present invention must shift to the next order when it arrives at a similar point. Since the apparatus, however, cannot anticipate whether the number (divisor) transferred from the storage mechanism to the calculating mechanism will bring the remainder in the calculating mechanism below zero, this subtraction operation is also performed. As the gear passes through zero, pawl 252 is rotated. Then the number just subtracted is again added, so that the same remainder is present in the calculating mechanism as was present just before the last subtraction operation in which a gear passed through the zero point. Passing through the zero point the second time actuates pawl 252, and the computer carriage jumps to the next lower order. The subtraction operation now takes place in this next lower order.

The entire subtraction operation then proceeds by repetition of the above processes, and the number of subtractions in each order are recorded in the counter mechanism.

IX.—THE RE-TRANSFER OPERATION

During the re-transfer operation, a numerical value in the calculating mechanism or the counter mechanism is to be transferred to the storage mechanism. During the operation, the apparatus carries through the following operational steps:

(1) Gear sets 11 and 12 of the storage mechanism are engaged with each other (by means of the input main clutch 134).

(2) The storage mechanism, with the gear sets 11, 12 coupled together, is brought into engagement with the subtraction gears 221 of the computer carriage.

(3) Pawls 17 and 18 rotate approximately 180 degrees in order that the projections 15 and 16 on gears 11 and 12 have no obstacles in their path during their later run. To accomplish this, the rotation of the storage controlling main clutch 161 is stopped after approximately 150 degrees of rotation, by help of a return drive clutch.

(4) The gear sets 11 and 12 are disengaged from each other.

(5) The numerical values present in the computer carriage mechanisms are transferred to the upper gears 12 by driving the gear 235 and gears 234. According to the position of the computer carriage either the value from the calculating mechansm or the value from the counter mechanism is thus retransferred.

(6) The gear sets 11 and 12 are again coupled to each other.

(7) The storage mechanism is disengaged from the gears of the computer carriage by again engaging the main clutch 161.

(8) By rotation of the pawls 17, 18, the upper gears 12 are set back to zero, thereby transferring the numerical value to the lower gears 11. This value can then be used in further addition, subtraction, multiplication or division operations. To accomplish any one of these further operations, as soon as the retransfer operation is completed, one need only depress the appropriate function key without the necessity of entering a new value via the number keys 50.

Figure 23:
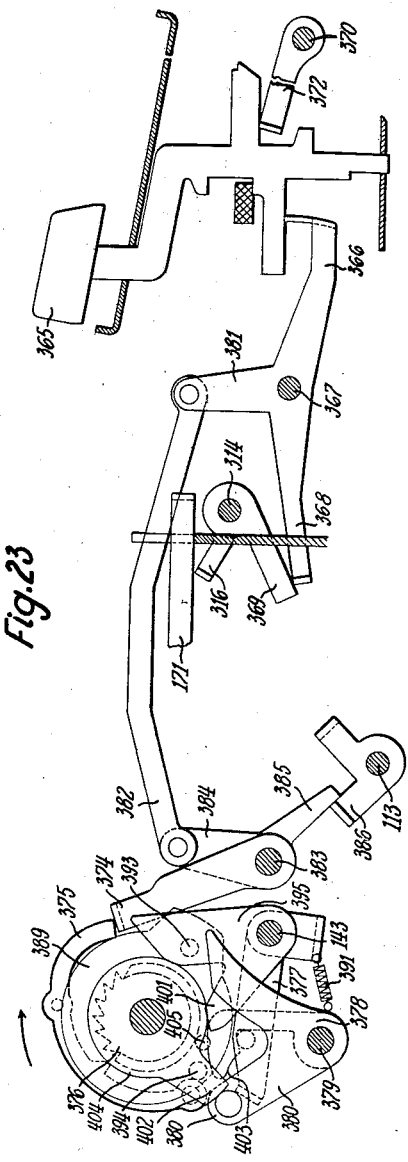
FIGURE 23 is a view of the return drive clutch and associated mechanism.

These operational steps are controlled as follows: As shown in FIGURE 23, the re-transfer key 365 operates on rocker arm 366, which is mounted on shaft 367 and has a shape similar to that of rocker arm 292. The rocker arm has two extension arms 368 and 381. Arm 368 operates on a crank 369 mounted on shaft 64. Another crank arm 316 on the same shaft lifts push rod 171 so as to interrupt the linkage through which the main clutch 161 actuates the clearing clutch 175.

Re-transfer key 365 has another tang which operates on rocker arm 372 mounted on shaft 370. Shaft 370 carries on its other end, on the opposite side of the apparatus, an arm 371 (see FIG. 18) which rotates rocker arm 255, whereupon the addition operation described above under Section VI is carried out. The counter carriage 93 is thereby pushed into the subtraction position, and the addition clutch 122 and the input main clutch 134 are actuated through crank 105. During this operation stop plate 7 for the value entry rods 9 is also lifted. However, the value entry rods 9 are blocked by the zero rail 373 of the pin carriage. This is shown in FIGURE 3. The subtraction position is required because the drive direction of the release gears is fixed, and also because the gears of the upper gear set 12 may be rotated only in one direction during the re-transfer operation, due to the position of the wheel projections 15 and 16 relative to the tangs. Main clutch 134 also actuates the main clutch 161 through push rod 153, so that as already described, the gears 12 of the storage mechanism engage with the subtraction primary gears 221 of the calculating mechanism or of the counter mechanism. As outlined above, the main clutch 161 does not turn a full revolution, but comes to stop after a rotation of approximately 150 degrees. This interruption is accomplished by the return drive clutch 375.

The return drive clutch 375 is actuated in a manner similar to that of the other clutches. A pull rod 382 is mounted on the extension arm 381 of the rocker arm 366. On the free end of the pull rod 382 is linked a crank 384 mounted on shaft 383. Also on shaft 383 is mounted a trip lever 374 of the return drive clutch 375. The lower arm 385 of the trip lever serves, in the same manner as with all the other clutches, to actuate a crank 386 mounted on shaft 113 to operate the start switch 115.

The gears 387 and 388 drive the return drive clutch 375. Three cam plates 390, 392 and 404 are driven by the return drive clutch.

The temporary opening of the main clutch 161 is controlled by the cam plate 390. On cam plate 390 is mounted a pin 393 which contacts a V-shaped lever 380. Lever 380 is mounted on shaft 379, to which a detent lever 378 is also keyed. This detent lever 378 hooks over a pin on locking lever 377 on the main clutch 161. When cam plate 390 rotates the V-shaped lever 380, detent lever 378 releases the locking lever 377 so that it can swing into the path of the ratchet pawl 161' of the main clutch 161. When the main clutch 161 rotates, locking lever 377 lifts ratchet pawl 161' so that the clutch 161 is disengaged. The locking lever 377 is pivotally mounted on shaft 143. Cam plate 392, which is driven by the return drive clutch 375, carries a pin 394, which operates on lever 395 keyed to shaft 143. When the pin 394 contacts lever 395 a rotational movement is transmitted to shaft 143, which uncouples the gear sets 11 and 12 from each other. This is shown in FIGURE 7.

The drive of the clearing gears on the counter carriage is similarly initiated by cam plate 392. As shown in FIG. 3, cam plate 392 carries an additional pin 396 which actuates slide 397. As shown in FIG. 13, this slide acts through arm 398, crank 399 and rod 400 to transfer a motion to arm 244. Thus the clutch for the calculating mechanism, and in the present embodiment of the invention also the clutch for the clearing of values in the counter mechanism, are actuated. The cancelled numerical value is thereby entered into the upper gearset 12 of the storage mechanism.

Refer to FIG. 21. Upon further rotation of the cam plate 390, a pin 405 mounted thereon contacts the surface 401 of the V-shaped lever 395. The resulting rotation is transferred to shaft 143, to which lever 395 is keyed. Rotation is in such a direction as to cause the gearsets 11 and 12 of the shifting mechanism to again become coupled.

Cam plate 404 which also is driven by the return drive clutch 375 has a projection 402 which rotates the V-shaped lever 308 in such a manner that the slant surface 403 of the detent lever 378 pulls the locking lever 377 away from the main clutch 161, so that this clutch is engaged again, and the interrupted rotational movement of the main clutch 161 is resumed. The numerical value in the upper gears 12 is thereby entered into the lower gears 11 of the storage mechanism.

At the end of the revolution the main clutch 161 disengages automatically by virtue of the ratchet pawl 161' engaging the trip lever, without initiating engagement of the clearing main clutch 175.

X.—MULTIPLICATION BY A CONSTANT FACTOR

The apparatus of the present invention provides an arrangement whereby during the multiplication operation a constant factor can be immediately entered again into the multiplier mechanism, without the necessity of rekeying the multiplier every time. This is accomplished by transferring the multipler from the counter mechansm into gear racks during the multiplication and clearing operations. The multiplier can be re-transferred from the racks back to the counter mechanism. Refer to FIGS. 17 and 24. The several number wheels 217 are mounted to rotate on shaft 410. To each number wheel is fixed a small ten tooth gear 409, which can engage a gear rack 406. Each gear rack 406 is guided between a separation plate 411 on one side and a number wheel 217 on the other. The racks 406 are also guided on their lower halves between two horizontal rods 407 and 408. In addition leaf spring 415 presses against the lower part of each rack 406.

As shown in FIG. 24 the leaf spring 415 tends to rotate the rack clockwise about the pivot between the rods 407 and 408 and thus to keep the rack out of engagement with its corresponding gear 409. To counteract this tendency, a horizontal rod 412 runs across the upper halves of the racks. Rod 412 is mounted with both ends on eccentric levers 413, which in turn are mounted on an eccentric 424 on shaft 425. Shaft 425 is mounted to rotate in the housing of the counter carriage. A lever (not shown for sake of clarity) allows moving shaft 425 in such a manner that the rod 412 may occupy selectively a position corresponding either to that of the shortest distance from shaft 420 or to that of the greatest distance from shaft 425.

When the rod 412 occupies the position corresponding to the shortest distance from shaft 420, the racks 406 are engaged with the corresponding gears 409. When the rod 412 occupies the position corresponding to that of the greatest distance from shaft 425, racks 406, in response to action of spring 415, pivot such that they are disengaged from gears 409.

As shown in FIG. 14, upon entry of the multiplier into the counter mechanism racks 406 are engaged with gears 409 by the manual pivoting of a lever parallel to lever 414, which transmits a rotation to shaft 425. During the following multiplication operation the multiplier is returned to zero. Racks 406 are advanced in the same proportion, so that the multiplier at the end of the multiplication operation is recorded in the racks.

In FIG. 17 are shown the sidewalls 419 of the counter mechanism with slots running parallel to rods 406. A horizontal rod 420 passes through the slots, with connecting straps 421 linked to its ends. The other ends of straps 420 are in turn linked with arms 417, mounted on shaft 416. The manual lever 414, maintained in its rest position by spring 423, is mounted on the outer end of arm 417.

When it is desired to re-enter the value present in the racks back into the counter mechanism the rod 420 is moved by the manual lever 414 longitudinally downward in slots 418 in the direction of the racks 406. Thus the rod 420 engages the front ends 422 of the rods 406 and returns them to their original positions. The value present in the racks is thus retransferred to the number wheels 217 in the counter mechanism.

The apparatus has another special feature in that the result of a multiplication operation may be added to a value appearing in the counter mechanism, or subtracted therefrom. When the positive multiplication key (×=pos) is depressed the multilevers 320 become engaged with the tooth 319 of a lever mounted on control guide 272, in the manner described above in VII. When the negative multiplication key (×=neg) is depressed, a lever corresponding to the lever 312 shown in FIG. 14 is swung on the control-guide 272 in such a manner that its tooth 426 is interposed into the path of the multilevers 320. The tooth 426 is displaced relative to the tooth 319 in such a manner that instead of the addition gears 220 the subtraction gears 221 of the calculating mechanism engage the shifting mechanism. Thereby the result of a multiplication operation is deducted from a number entered in the calculating mechanism.

Following now are the definitions of major terms used for claim purposes:

The storage mechanism comprises the gears 11, 12 and linkages which transfer the entry value keyed into the key-board and input mechanism to the computer carriage and vice versa and in certain instances stores the values in the upper gear set 12 and/or in the lower gears set 11.

The pin carriage comprises the setting pins and linkages by which the entry values keyed into the key-board are transferred to the gear racks 67 and 9 of the input mechanism.

The first main-function-section is the input section which comprises the key-board, means to enter the value into the pin carriage, means to sense the value entered into the pin carriage, and means to transfer the value from the pin carriage into the storage mechanism and means to engage the storage mechanism.

The second main-function section is the storage and transfer section which comprises means to transfer the value from the storage mechanism into the calculating mechanism and into the accumulator and thereafter to re-transfer the value into the storage mechanism.

The third main function section is the clearing section which comprises means to restore the apparatus to its original position and to cancel the value stored in the storage mechanism.

The three main clutches are: The input main clutch 134 associated with the input section, the storage controlling main clutch 161 associated with the storage and transfer section, and the clearing main clutch 175 associated with the clearing section. The three clutches are sequentially actuated by elements of the respective other main sections.

The pin carriage sensing means are means to sense the value keyed into the pin carriage and comprise a plurality of input elements having rack portions.

The computer carriage is a transversely movable apparatus comprising the counter mechanism on the right and the calculating mechanism on the left, and whose function is to accumulate the results of the various calculating operations and present them in a readable fashion to the operator.

The "initial position" is the starting position when all elements are at zero and at rest.

The main function groups do not always operate in the sequence of the groups defined hereinbefore as the "firsts" the "second" and the "third" main function group but in any sequence, in accordance with desired functions. Generally, the clutch of each main function section is actuated by the main function section previously in operation and disengaged by the main function section following in operation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

We claim:

1. In a calculator, in combination, input means; an accumulator mechanism; a storage mechanism; a first main function section including means for sensing the input means, and connected to said storage mechanism for transferring a value from said input means into said storage mechanism; a second main function section including first means for connecting said storage mechanism to said accumulator mechanism, second means for operating said storage mechanism to transfer a value stored therein into said accumulator mechanism, and third means for disconnecting said storage mechanism from said accumulator mechanism; a third main function section comprising means for clearing said storage mechanism; drive means; a first main clutch having a coupling position for connecting said drive means to said means of said first main function section; a second main clutch having a coupling position for connecting said drive means to said means of said second main function section to operate said first, second and third means in a predetermined sequential manner; a third main clutch having a coupling position for connecting said drive means to said means of said third main function section; operating means for moving said first main clutch to said coupling position; means controlled by said first main clutch in said coupling position upon reaching a predetermined point in its cycle to move said second main clutch to said coupling position; means controlled by said second main clutch in said coupling position upon reaching a predetermined point in its cycle to move said third main clutch to said coupling position; and means for disengaging any one of said main clutches when another one of said main clutches is moved to said coupling position thereof.

2. In a calculator, in combination, input means including a pin carriage; an accumulator mechanism; first and second storage mechanisms; a first main function section including means for sensing said pin carriage, and connected to said first storage mechanism to transfer a value from said pin carriage into said first storage mechanism, and including means for connecting said first storage mechanism to said second storage mechanism; a second main function section including means for connecting said first and second storage mechanisms to said accumulator mechanism, including means for operating said first storage mechanism to transfer a value stored therein into said second storage mechanism and into said accumulator mechanism, including means for disconnecting said first and second storage mechanisms from said accumulator mechanism, and including means for operating said second storage mechanism to transfer a value stored therein into said first storage mechanism; a third main function section comprising means for clearing said first storage mechanism; drive means; a first clutch having a coupling position for connecting said drive means to said means of said first main function section; a second clutch having a coupling position for connecting said drive means to said means of said second main function section to operate said last-mentioned means in a predetermined sequential manner; a third clutch having a coupling position for connecting said drive means to said means of said third main function section; a function key for moving said first clutch to said coupling position; means controlled by said first clutch in said coupling position upon reaching a predetermined point in its cycle to move said second clutch to said coupling position; means controlled by said second clutch in said coupling position upon reaching a predetermined point in its cycle to move said third clutch to said coupling position; and means for disengaging any one of said clutches when another one of said clutches is moved to said coupling position thereof.

3. In a calculator, in combination, input means; an accumulator mechanism; a computer carriage supporting said accumulator mechanism; means urging said computer carriage to return to an initial position, and including a carriage return clutch, said computer carriage including means for disengaging said carriage return clutch in a selected position; a storage mechanism; a first main function section including means for sensing the input means, and connected to said storage mechanism for transferring a value from said input means into said storage mechanism; a second main function section including first means for connecting said storage mechanism to said accumulator mechanism, second means for operating said storage mechanism to transfer a value stored therein into said accumulator mechanism, and third means for disconnecting said storage mechanism from said accumulator mechanism; a third main function section comprising means for clearing said storage mechanism; drive means; a first main clutch having a coupling position for connecting said drive means to said means of said first main function section; a second main clutch having a coupling position for connecting said drive means to said means of said second main function section to operate said first, second and third means in a predetermined sequential manner; a third main clutch having a coupling position for connecting said drive means to said means of said third main function section; operating means for moving said first main clutch to said coupling position; means controlled by said first main clutch in said coupling position upon reaching a predetermined point in its cycle to move said second main clutch to said coupling position; means controlled by said second main clutch in said coupling position upon reaching a predetermined point in its cycle to move said third main clutch to said coupling position; and means for disengaging any one of said main clutches when another one of said main clutches is moved to said coupling position thereof.

4. A calculator as set forth in claim 3 wherein said storage mechanism includes a set of ordinally arranged gears rotatable about an axis extending in the direction of movement of said computer carriage; wherein said accumulator mechanism includes a set of ordinally arranged gears rotatable about an axis extending in the direction of the movement of said computer carriage; and comprising means for aligning said storage mechanism with said accumulator mechanism to place selected ordinal gears of said accumulator mechanism and storage mechanism opposite each other so that a numerical value stored in said gears of said storage mechanism is transferred to predetermined gears of said accumulator mechanism.

5. A calculator as set forth in claim 4 and including means for stopping said computer carriage in a position in which the gear of the highest order of said accumulator mechanism is located opposite the gear of the highest order of said storage mechanism.

6. A calculator as set forth in claim 1 wherein said input means include a pin carriage; means for moving said pin carriage to a terminal position; and means for transferring a numerical value entered in said pin carriage to the highest orders of said accumulator mechanism when said pin carriage is in one of its end positions.

7. In a calculator, in combination, input means; an accumulator mechanism; a storage mechanism; a first main function section including means for sensing the input means, and connected to said storage mechanism for transferring a value from said input means into said storage mechanism; a second main function section including first means for connecting said storage mechanism to said accumulator mechanism, second means for operating said storage mechanism to transfer a value stored therein into said accumulator mechanism, and third means for disconnecting said storage mechanism from said accumulator mechanism; a third main function section comprising means for clearing said storage mechanism; drive means; a first main clutch having a coupling position for connecting said drive means to said means of said first main function section; a second main clutch having a coupling position for connecting said drive means to said means of said second main function section in said coupling position upon reaching a predetermined point in its cycle; a third main clutch having a coupling position for connecting said drive means to said means of said third main function section; operating means for moving said first main clutch to said coupling position; means controlled by said first main clutch in said coupling position upon reaching a predetermined point in its cycle to move said second main clutch to said coupling position; means controlled by said second main clutch in said coupling position upon reaching a predetermined point in its cycle to move said third main clutch to said coupling position; an accumulator carriage supporting said accumulator mechanism; means controlled by said accumulator carriage in a predetermined position of the same to move said second main clutch to said coupling position; means controlled by said accumulator carriage in a predetermined position of the same to move said third main clutch to said coupling position; and means for disengaging any one of said main clutches when another one of said main clutches is moved to said coupling position thereof.

8. In a calculator, in combination, input means including a pin carriage; an accumulator mechanism; two storage mechanisms; a first main function section including means for sensing said pin carriage, and connected to said first storage mechanism to transfer a value from said pin carriage into said first storage mechanism, and including means for connecting said first storage mechanism to said second storage mechanism; a second main function section including means for connecting said first and second storage mechanisms to said accumulator mechanism, including means for operating said first storage mechanism to transfer a value stored therein into said second storage mechanism and into said accumulator mechanism, including means for disconnecting said first and second storage mechanisms from said accumulator mechanism, and including means for operating said second storage mechanism to transfer a value stored therein into said first storage mechanism; a third main function section comprising means for clearing said first storage mechanism; drive means; a first clutch having a coupling position for connecting said drive means to said means of said first main function section; a second clutch having a coupling position for connecting said drive means to said means of said second main function section to operate said last-mentioned means in a predetermined sequential manner; a third clutch having a coupling position for connecting said drive means to said means of said third main function section; a function key for moving said first clutch to said coupling position; means controlled by said first main clutch in said coupling position upon reaching a predetermined point in its cycle to move said second main clutch to said coupling position; means controlled by said second main clutch in said coupling position upon reaching a predetermined point in its cycle to move said third main clutch to said coupling position; an accumulator carriage supporting said accumulator mechanism; means controlled by said accumulator carriage in a predetermined position of the same to move said second clutch to a coupling position; means controlled by said accumulator carriage in a predetermined position of the same to move said third clutch to a coupling position; and means for disengaging any one of said clutches when another one of said clutches is moved to said coupling position thereof.

9. In a calculator, in combination, input means including a pin carriage; an accumulator mechanism including a set of ordinally arranged counter gears; a storage mechanism including a first set of ordinally arranged first storage gears and a second set of ordinally arranged second storage gears; a first main function section including means for sensing said pin carriage, and connected to said first set of first storage gears to transfer a value from said pin carriage into said first set of first storage gears, and including means for placing said first and second storage gears in a meshing position; a second main function section including means for connecting said second storage gears to said counter gears of said accumulator mechanism, including means for turning said first storage gears to transfer a value stored therein to said second storage gears and to said counter gears of said accumulator mechanism, including means for disconnecting said second set of second storage gears from said counter gears, and including means for rotating said second storage gears to transfer a value stored therein back to said first storage gears; a third main function section comprising means for clearing said first storage gears; drive means; a first clutch having a coupling position for connecting said drive means to said means of said first main function section; a second clutch having a coupling position for connecting said drive means to said means of said second main function section to operate said last-mentioned means in a predetermined sequential manner; a third clutch having a coupling position for connecting said drive means to said means of said third main function section; operating means for moving said first clutch to said coupling position; means controlled by said first clutch in said coupling position upon reaching a predetermined point in its cycle to move said second clutch to said coupling position; means controlled by said second clutch in said coupling position upon reaching a predetermined point in its cycle to move said third clutch to said coupling position; and means for disengaging any one of said clutches when another one of said clutches is moved to said coupling position thereof.

10. In a calculating machine, in combination, input means movable between digit representing positions; accumulator means; a first storage means; a second storage means; drive means for said first and second storage means; three connecting means for respectively connecting said first storage means to said input means in a first position, for connecting said first storage means to said second storage means, and for connecting said second storage means to said accumulator means in a second position; and control means for actuating said three connecting means in a selected timed sequence so that a numerical value is first transferred from said input means to said first storage means, then transferred from said first storage means to said second storage means and to said accumulator means, and then cleared from said second storage means and re-entered in said first storage means.

11. A calculator machine as set forth in claim 10 wherein said accumulator means, said first storage means, and said second storage means, each include a set of ordinally arranged gears, and wherein said input means includes a set of ordinally arranged rack bars; and wherein said input means are connected in said first position to said first storage means when the gears of the same mesh with said rack bars, wherein said first and second storage means are connected when said gears of said first and second storage means mesh with each other, and wherein said second storage means is connected to said accumulator means in said second position when said gears of said second storage means mesh with said gears of said accumulator means.

12. In a calculating machine, in combination, a set of ordinally arranged toothed input means movable between digit representing positions; a set of ordinally arranged counter gears; a first set of ordinally arranged first storage gears; a second set of ordinally arranged second storage gears, each storage gear having a control member; movable support means supporting said first and second sets of storage gears for movement between a first position in which said first storage gears mesh with said input means in which first position said second storage gears are spaced from said first storage gears and from said counter gears, a second position in which said second storage gears mesh with said first storage gears and with said counter gears and in which said first storage gears are spaced from said input means, and a third position in which said first and second storage gears mesh with each other and are spaced, respectively from said input means and said counter gears; stop means on said support means located in the path of movement of said control members for stopping said first and second storage gears in initial zero positions; reversible rotary drive means having first and second coupling parts for engaging said control members so as to rotate said first and second storage gears independently of each other; and control means for actuating said input means and said drive means and for moving said support means between said positions in a timed sequence so that said input means turn said first storage gears in said first position to a digit representing position, so that said drive means rotate said first and second gears in one direction in said second position until said control members engage said stop means whereby digits entered into said first gears in said first position are entered in said second position into said counter gears, and so that said drive means rotate said first and second gears in said third position in the opposite direction until said control members engage said stop means whereby the digits are re-entered in said first storage gears and cleared from said second storage gears.

13. In a calculating machine, in combination, a set of ordinally arranged toothed input rack bar means movable between digit representing positions; a set of ordinally arranged counter gears; a first set of ordinally arranged first storage gears; a second set of ordinally arranged second storage gears, each storage gear having a projecting control member; movable support means including rotary drive shaft means supporting said first and second sets of storage gears for rotation and for movement with said drive shaft means between a first position in which said first storage gears mesh with said input means in which first position said second storage gears are spaced from said first storage gears and from said counter gears, a second position in which said second storage gears mesh with said first storage gears and with said counter gears and in which said first storage gears are spaced from said input means, and a third position in which said first and second storage gears mesh with each other and are spaced, respectively, from said input means and said counter gears; stop means on said support means located in the path of movement of said projecting control members for stopping said first and second storage gears in initial zero positions; reversible rotary drive means for driving said drive shaft means, said drive shaft means having first and second coupling pawls for engaging said projecting control members so as to rotate said first and second storage gears independently of each other; and control means for actuating said input means and said drive means and for moving said support means between said positions in a timed sequence so that said input means turn said first storage gears in said first position to a digit representing position, so that said drive shaft means rotates said first and second gears in one direction in said second position until said control members engage said stop means whereby digits entered into said first gears in said first position are entered in said second position into said counter gears, and so that said drive shaft means rotate said first and second gears in said third position in the opposite direction until said projecting control members engage said stop means whereby the digits are re-entered in said first storage gears and cleared from said second storage gears.

14. In a calculating machine, in combination, a set of ordinally arranged toothed input rack bar means movable between digit representing positions; a set of ordinally arranged counter gears; a first set of ordinally arranged first storage gears; a second set of ordinally arranged second storage gears, each storage gear having a projecting control member; movable supporting means including a support shaft, first and second supports mounted on said support shaft for pivotal movement, first and second drive shaft means mounted on said first and second supports for rotation and supporting, respectively, said first and second sets of storage gears for rotation and for movement with said first and second supports, and a third support turnably mounted on one of said drive shaft means and having a guide track operably connected to the other drive shaft means, said third support being turnable for moving said other drive shaft means with the support thereof toward and away from said one drive shaft means so that said first and second sets of storage gears are movable between a first position in which said first storage gears mesh with said input means in which first position said second storage gears are spaced from said first storage gears and from said counter gears, a second position in which said second storage gears mesh with said first storage gears and with said counter gears and in which said first storage gears are spaced from said input means, and a third position in which said first and second storage gears mesh with each other and are spaced, respectively, from said input means and said counter gears; stop means on said support means located in the path of movement of said projecting control members for stopping said first and second storage gears in initial zero positions; reversible rotary drive means for driving said drive shaft means, said drive shaft means having first and second coupling pawls for engaging said projecting control members so as to rotate said first and second storage gears independently of each other; and control means for actuating said input means and said drive means, and for moving said supports with said drive shaft means and first and second sets of storage gears between said positions in a timed sequence so that said input means turn said first storage gears in said first position to a digit representing position, so that said drive shaft means rotate said first and second gears in one direction in said second position until said control members engage said stop means whereby digits entered into said first gears in said first position are entered in said second position into said counter gears, and so that said drive shaft means rotate said first and second gears in said third position in the opposite direction until said projecting control members engage said stop means whereby the digits are reentered in said first storage gears and cleared from said second storage gears.

15. A calculator as set forth in claim 14 wherein said control means include a driven cam means, and cam follower means operatively connected to one support of said first and second supports, and another cam follower means operatively connected to said third support for moving said supports, and thereby said first and second sets of storage gears between said positions.

16. A calculator as set forth in claim 14 wherein said third support is turnably mounted on said first drive shaft means, and wherein said guide track engages said second drive shaft means; and wherein said control means is operatively connected to said first support and to said third support for operating the same so that said first and second drive shaft means and said first and second sets of storage gears move between said positions.

17. In a calculating machine, in combination, a stepwise movable computer carriage; an accumulator including a set of ordinal gears mounted on said computer carriage; a plurality of ordinally arranged movable input elements movable between positions corresponding to numerical values, and having rack portions; a storage mechanism including a first set of ordinally arranged gears cooperating with said rack portions for storing a numerical value and a second set of ordinally arranged gears, said first and second sets of gears being movable to and from a position meshing with each other, and said second set of gears being movable to a position meshing with said gears of said accumulator; means for operating said storage mechanism so that said second set of gears thereof transfers a numerical value received by said first set of gears from said input elements to said gears of said accumulator; clearing means for clearing said storage mechanism; and means for actuating said clearing means and controlled and operated by said computer carriage when the same moves to a control position after termination of a multiplication or division.

18. A calculating machine as set forth in claim 17 wherein said clearing means includes a clearing clutch; and including a main clutch, a multiplication key and a division key; and including linkage means operatively connecting said main clutch and said clearing clutch, said linkage means being controlled by said keys to interrupt the operative connection between said clutches upon operation of said keys.

19. In a calculating machine, in combination, a storage mechanism; a computer carriage means; a totalizer means and a counter means mounted on said computer carriage means and adapted to cooperate with said storage mechanism in predetermined positions of said carriage means; a first stop member and a second stop member on said computer carriage means and respectively correlated with said totalizer means and said counter means; a shiftable control means including an element movable to and from a position respectively located in the paths of movement of said first and second stop members during movement of said computer carriage means; a division key and a multiplication key operatively connected to said element, respectively, for effecting movement of the same to said position thereof, said element being positioned relative to said storage mechanism, and said stop members being positioned relative to said totalizer means and counter means so that when said second stop member abuts said element, corresponding orders of said counter means and of storage mechanism are located opposite each other, and so that corresponding orders of said totalizer means and said storage mechanism are located opposite each other when said first stop member abuts said element.

20. A calculating machine as set forth in claim 19 wherein said computer carriage means has an initial end position in which said element is located between said stop members.

21. A calculating machine as set forth in claim 19 wherein said carriage means has an initial end position and another end position; drive means for moving said carriage means to said other end position; means connecting said drive means with said division key so that said drive means is actuated upon operation of said division key; and including coupling means disengaged by said carriage means in said other end position so that said carriage means stops in said other end position.

References Cited in the file of this patent

UNITED STATES PATENTS

| | | |
|---|---|---|
| 754,836 | Baird | Mar. 15, 1904 |
| 1,098,353 | Morse | May 26, 1914 |
| 1,878,125 | Fuller | Sept. 20, 1932 |
| 2,281,851 | Mehan | May 5, 1942 |
| 2,340,261 | Eichler | Jan. 25, 1944 |
| 2,399,890 | Pott | May 7, 1946 |
| 2,603,417 | Pinckney | July 15, 1952 |
| 2,721,698 | Gang | Oct. 25, 1955 |
| 2,780,411 | Kiel et al. | Feb. 5, 1957 |
| 2,834,542 | Sundstrand | May 13, 1958 |
| 2,886,238 | Plunkett | May 12, 1959 |
| 2,915,244 | Neumann-Lezius | Dec. 1, 1959 |
| 2,935,254 | Plunkett | May 3, 1960 |
| 2,945,622 | Heinze | July 19, 1960 |
| 2,970,754 | Gang | Feb. 7, 1961 |